United States Patent
Islam et al.

(10) Patent No.: US 10,455,547 B2
(45) Date of Patent: Oct. 22, 2019

(54) PROVISION OF A PAGING RESPONSE BETWEEN TRANSMISSIONS OF A PAGING INDICATION AND PAGING INFORMATION

(71) Applicant: QUALCOMM Incorporated, San Diego, CA (US)

(72) Inventors: Muhammad Nazmul Islam, Edison, NJ (US); Tao Luo, San Diego, CA (US); Karl Georg Hampel, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,548

(22) Filed: Sep. 19, 2017

(65) Prior Publication Data

US 2018/0199309 A1    Jul. 12, 2018

Related U.S. Application Data

(60) Provisional application No. 62/444,301, filed on Jan. 9, 2017, provisional application No. 62/459,572, filed
(Continued)

(51) Int. Cl.
*H04W 68/02* (2009.01)
*H04W 56/00* (2009.01)
(Continued)

(52) U.S. Cl.
CPC .......... *H04W 68/02* (2013.01); *H04B 7/0421* (2013.01); *H04B 7/0619* (2013.01);
(Continued)

(58) Field of Classification Search
CPC ............... H04W 72/042; H04W 88/08; H04W 72/0406; H04W 72/1273; H04W 28/06;
(Continued)

(56) References Cited

U.S. PATENT DOCUMENTS

2007/0254679 A1* 11/2007 Montojo ............... H04L 5/0053
455/458
2011/0243080 A1    10/2011 Chen et al.
(Continued)

FOREIGN PATENT DOCUMENTS

WO    WO-2015069970 A1    5/2015
WO    WO-2015147717 A1    10/2015

OTHER PUBLICATIONS

International Search Report and Written Opinion—PCT/US2017/068506 —ISA/EPO—dated Mar. 22, 2018.

*Primary Examiner* — Kwasi Karikari
(74) *Attorney, Agent, or Firm* — Holland & Hart LLP

(57) ABSTRACT

A method for wireless communication at a user equipment (UE) includes receiving, from a base station, an indication of uplink transmission resources allocated for a paging response to a paging indication, receiving the paging indication from the base station, and transmitting, to the base station, the paging response to the received paging indication. The paging response is transmitted on at least one of the uplink transmission resources allocated for the paging response. A method for wireless communication at a base station includes identifying uplink transmission resources for paging responses, transmitting an indication of the uplink transmission resources allocated for paging responses, transmitting a paging indication to at least one UE, and receiving a paging response from one or more UEs using a receive beam sweep. The paging response is received on an associated beam on at least one of the uplink transmission resources allocated for paging responses.

25 Claims, 18 Drawing Sheets

Related U.S. Application Data on Feb. 15, 2017, provisional application No. 62/476,678, filed on Mar. 24, 2017.

(51) Int. Cl.
| | |
|---|---|
| *H04B 7/0417* | (2017.01) |
| *H04W 16/28* | (2009.01) |
| *H04B 7/06* | (2006.01) |
| *H04B 7/08* | (2006.01) |
| *H04L 5/00* | (2006.01) |
| *H04W 88/08* | (2009.01) |
| *H04W 88/02* | (2009.01) |

(52) U.S. Cl.
CPC ........... *H04B 7/0695* (2013.01); *H04B 7/088* (2013.01); *H04L 5/0053* (2013.01); *H04W 16/28* (2013.01); *H04W 56/001* (2013.01); *H04L 5/0048* (2013.01); *H04W 88/02* (2013.01); *H04W 88/08* (2013.01)

(58) Field of Classification Search
CPC . H04W 72/04; H04W 72/0453; H04W 76/02; H04W 28/18; H04W 28/26; H04W 72/005; H04W 72/0446; H04W 92/18; H04W 76/022
See application file for complete search history.

(56) References Cited

U.S. PATENT DOCUMENTS

| | | | |
|---|---|---|---|
| 2014/0128109 A1* | 5/2014 | Li | H04W 68/02 455/458 |
| 2014/0177561 A1 | 6/2014 | Yu et al. | |
| 2014/0206370 A1 | 7/2014 | Worrall et al. | |
| 2015/0049824 A1 | 2/2015 | Kim et al. | |
| 2016/0081072 A1 | 3/2016 | Zhang et al. | |
| 2016/0381672 A1 | 12/2016 | Kim et al. | |
| 2018/0027522 A1* | 1/2018 | Lee | H04W 68/02 370/336 |

\* cited by examiner

PROVISION OF A PAGING RESPONSE BETWEEN TRANSMISSIONS OF A PAGING INDICATION AND PAGING INFORMATION

CROSS REFERENCES

The present Application for Patent claims priority to U.S. Provisional Patent Application No. 62/444,301 by Islam, et al., entitled "Provision of a Paging Response Between Transmissions of a Paging Indication and Paging Information," filed Jan. 9, 2017, and to U.S. Provisional Patent Application No. 62/459,572 by Islam, et al., entitled, "Provision of a Paging Response Between Transmissions of a Paging Indication and Paging Information", filed Feb. 15, 2017, and to U.S. Provisional Patent Application No. 62/476,678 by Islam, et al, entitled "Provision of a Paging Response Between Transmissions of a paging Indication and paging Information" filed Mar. 24, 2017 and are assigned to the assignee hereof.

BACKGROUND

The following relates generally to wireless communication, and more specifically to provision of a paging response between transmissions of a paging indication and paging information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, devices (e.g., base stations and UEs) may communicate using directional transmissions (e.g., beams), in which beamforming may be applied using multiple antenna elements to provide a beam in a particular direction. In some cases, a base station may be unaware of a particular location of a UE, such as when a gap in communications occurs while a UE is moving. When a first device does not know the direction in which to transmit to a second device, the first device may transmit to the second device by sweeping through a set of beams focused in different directions, and transmitting a duplicative signal or duplicative information on each of the beams. Alternatively, the first device may transmit on one or a few beams, and the second device may sweep through a set of beams in an attempt to locate the beam or beams on which the first device is transmitting. In some cases, both the first device and the second device may sweep through a set of beams to transmit and receive. However, sweeping through a set of beams may be costly in terms of time, power consumption, and air resources.

SUMMARY

The described techniques relate to improved methods, systems, devices, or apparatuses that support provision of a paging response between transmissions of a paging indication and paging information. In a wireless communications system, such as a millimeter wave (mmW) system or a New Radio (NR) system, a base station and a user equipment (UE) may utilize directional transmissions during a paging procedure. In some cases, a base station may transmit a paging indication (e.g., a paging notification) to one or more UEs by sweeping through a set of beams, and thus may provide to the one or more UEs an indication of uplink transmission resources allocated for paging responses. A UE that receives a paging indication may transmit a paging response to the base station on at least one of the uplink transmission resources allocated for the paging responses as identified in the paging indication. The paging response may be transmitted on a beam. The base station may receive paging responses from one or more of the UEs using a beam sweep, and may then transmit paging information to a UE on a beam on which the UE's paging response was received at the base station.

A method of wireless communication is described. The method may include receiving a paging indication from a base station and transmitting, in response to the received paging indication, a paging response to the base station on at least one uplink transmission resource allocated for the paging response.

An apparatus for wireless communication is described. The apparatus may include means for receiving a paging indication from a base station and means for transmitting, in response to the received paging indication, a paging response to the base station on at least one uplink transmission resource allocated for the paging response.

Another apparatus for wireless communication is described. The apparatus may include a processor, memory in electronic communication with the processor, and instructions stored in the memory. The instructions may be operable to cause the processor to receive a paging indication from a base station and transmit, in response to the received paging indication, a paging response to the base station on at least one uplink transmission resource allocated for the paging response.

A non-transitory computer readable medium for wireless communication is described. The non-transitory computer-readable medium may include instructions operable to cause a processor to receive a paging indication from a base station and transmit, in response to the received paging indication, a paging response to the base station on at least one uplink transmission resource allocated for the paging response.

Some examples of the method, apparatus, and non-transitory computer-readable medium described above may further include processes, features, means, or instructions for transmitting information for a base station beam in the paging response.

Some examples of the method, apparatus, and non-transitory computer-readable medium described above may further include processes, features, means, or instructions for receiving paging information from the base station, the paging information transmitted by the base station based at least in part on the transmitted beam information.

Some examples of the method, apparatus, and non-transitory computer-readable medium described above may further include processes, features, means, or instructions for identifying the base station beam based at least in part on a link quality of a synchronization signal.

In some examples of the method, apparatus, and non-transitory computer-readable medium described above, the synchronization signal comprises a primary synchronization signal (PSS), or a secondary synchronization signal (SSS), or a demodulation reference signal (DMRS) of a physical broadcast channel (PBCH), or a PBCH, or a combination thereof.

In some examples of the method, apparatus, and non-transitory computer-readable medium described above, the uplink transmission resource identifies an uplink transmission time, or a subcarrier region, or a preamble, or a combination thereof.

Some examples of the method, apparatus, and non-transitory computer-readable medium described above may further include processes, features, means, or instructions for receiving, from the base station, an indication of uplink transmission resources allocated for the paging response to the paging indication, wherein the indicated uplink transmission resources include the at least one uplink transmission resource.

In some examples of the method, apparatus, and non-transitory computer-readable medium described above, the paging indication comprises a paging index associated with a group of mobile subscriber identities, and the paging response comprises a paging index-specific transmission.

In some examples of the method, apparatus, and non-transitory computer-readable medium described above, the paging index-specific transmission comprises a paging index-specific preamble.

Some examples of the method, apparatus, and non-transitory computer-readable medium described above may further include processes, features, means, or instructions for receiving, in response to transmitting the paging response, at least one UE identifier associated with a page corresponding to the paging index.

Some examples of the method, apparatus, and non-transitory computer-readable medium described above may further include processes, features, means, or instructions for receiving with the paging index an indication of a type of mobile subscriber associated with the paging index.

In some examples of the method, apparatus, and non-transitory computer-readable medium described above, the paging indication includes a search space for a paging message, the search space comprises one or more slots or subframes for the paging message.

Some examples of the method, apparatus, and non-transitory computer-readable medium described above may further include processes, features, means, or instructions for monitoring resources indicated in the search space for the paging message.

Some examples of the method, apparatus, and non-transitory computer-readable medium described above may further include processes, features, means, or instructions for receiving the paging indication and the indication of the uplink transmission resources allocated for the paging response on a same channel.

Some examples of the method, apparatus, and non-transitory computer-readable medium described above may further include processes, features, means, or instructions for selecting the at least one uplink transmission resource on which the paging response may be transmitted by selecting from a number of opportunities for paging responses within a time interval and frequency range of the uplink transmission resources allocated for paging responses, wherein the number of opportunities may be allocated based at least in part on a presence or absence of time synchronization of UEs within a coverage area of the base station.

A method of wireless communication is described. The method may include transmitting a paging indication to at least one user equipment (UE) and receiving a paging response from one or more UEs of the at least one UE, the paging response received based at least in part on the transmitted paging indication.

An apparatus for wireless communication is described. The apparatus may include means for transmitting a paging indication to at least one user equipment (UE) and means for receiving a paging response from one or more UEs of the at least one UE, the paging response received based at least in part on the transmitted paging indication.

Another apparatus for wireless communication is described. The apparatus may include a processor, memory in electronic communication with the processor, and instructions stored in the memory. The instructions may be operable to cause the processor to transmit a paging indication to at least one UE and receive a paging response from one or more UEs of the at least one UE, the paging response received based at least in part on the transmitted paging indication.

A non-transitory computer readable medium for wireless communication is described. The non-transitory computer-readable medium may include instructions operable to cause a processor to transmit a paging indication to at least one UE and receive a paging response from one or more UEs of the at least one UE, the paging response received based at least in part on the transmitted paging indication.

Some examples of the method, apparatus, and non-transitory computer-readable medium described above may further include processes, features, means, or instructions for transmitting paging information to the one or more UEs on a base station beam, wherein information for the base station beam was received through the paging response.

In some examples of the method, apparatus, and non-transitory computer-readable medium described above, receiving the paging response from the one or more UEs comprises receiving the paging response from the one or more UEs comprises receiving the paging response from the one or more UEs using a receive beam sweep.

Some examples of the method, apparatus, and non-transitory computer-readable medium described above may further include processes, features, means, or instructions for identifying uplink transmission resources for paging responses. Some examples of the method, apparatus, and non-transitory computer-readable medium described above may further include processes, features, means, or instructions for transmitting, using a transmit beam sweep, an indication of the uplink transmission resources allocated for a paging response. Some examples of the method, apparatus, and non-transitory computer-readable medium described above may further include processes, features, means, or instructions for receiving the paging response from the one or more UEs based at least in part on the indicated uplink transmission resources.

In some examples of the method, apparatus, and non-transitory computer-readable medium described above, the uplink transmission resources allocated for paging responses comprise uplink transmission resources allocated to each of a plurality of paging indices representing groups of mobile subscriber identities, and the paging index-specific transmission comprises a transmission on an uplink transmission resource allocated to the paging index.

In some examples of the method, apparatus, and non-transitory computer-readable medium described above, the paging indication comprises a paging index associated with a group of mobile subscriber identities, and the paging response comprises a paging index-specific transmission.

In some examples of the method, apparatus, and non-transitory computer-readable medium described above, the paging index-specific transmission comprises a paging index-specific preamble.

Some examples of the method, apparatus, and non-transitory computer-readable medium described above may further include processes, features, means, or instructions for transmitting with the paging index an indication of a type of mobile subscriber associated with the paging index. Some examples of the method, apparatus, and non-transitory computer-readable medium described above may further include processes, features, means, or instructions for transmitting, in response to receiving the paging response, at least one UE identifier associated with a page corresponding to the paging index.

Some examples of the method, apparatus, and non-transitory computer-readable medium described above may further include processes, features, means, or instructions for transmitting a paging message to the one or more UEs using resources indicated in a search space, wherein the paging indication includes the search space to be monitored for the paging message transmitted to the one or more UEs.

In some examples of the method, apparatus, and non-transitory computer-readable medium described above, the paging indication may be transmitted by sweeping through a set of beams.

Some examples of the method, apparatus, and non-transitory computer-readable medium described above may further include processes, features, means, or instructions for transmitting an indication of the uplink transmission resources allocated for paging responses over at least one of a synchronization channel, a broadcast channel, a control channel, a radio resource control (RRC) channel, or a combination thereof.

Some examples of the method, apparatus, and non-transitory computer-readable medium described above may further include processes, features, means, or instructions for transmitting the paging indication over at least one of a synchronization channel, a broadcast channel, a control channel, a RRC channel, or a combination thereof.

Some examples of the method, apparatus, and non-transitory computer-readable medium described above may further include processes, features, means, or instructions for transmitting the paging indication over a broadcast channel simultaneously with synchronization signals by sweeping through a set of beams.

Some examples of the method, apparatus, and non-transitory computer-readable medium described above may further include processes, features, means, or instructions for uplink transmission resources allocated for paging responses comprise a set of one or more resources allocated for a group-based paging response, the group-based paging response comprising paging responses from a group of UEs.

Some examples of the method, apparatus, and non-transitory computer-readable medium described above may further include processes, features, means, or instructions for allocating a number of opportunities for paging responses within a time interval and frequency range of the uplink transmission resources allocated for paging responses, wherein the number of opportunities may be allocated based at least in part on a presence or absence of time synchronization of UEs within a coverage area of the base station.

Some examples of the method, apparatus, and non-transitory computer-readable medium described above may further include processes, features, means, or instructions for allocating the number of opportunities for paging responses based at least in part on the presence or absence of time synchronization of the UEs within the coverage area of the base station comprises at least one of allocating relatively more opportunities for paging responses for a first set of UEs that may be time-synchronized. Some examples of the method, apparatus, and non-transitory computer-readable medium described above may further include processes, features, means, or instructions for allocating relatively fewer opportunities for paging responses for a second set of UEs that may be not time-synchronized.

In some examples of the method, apparatus, and non-transitory computer-readable medium described above, allocating the number of opportunities for paging responses based at least in part on the presence or absence of time synchronization of the UEs within the coverage area of the base station comprises allocating a first set of opportunities for paging responses for a first set of UEs that may be time-synchronized. Some examples of the method, apparatus, and non-transitory computer-readable medium described above may further include processes, features, means, or instructions for allocating a second set of opportunities for paging responses for a second set of UEs that may be not time-synchronized.

DETAILED DESCRIPTION

Figure 1:
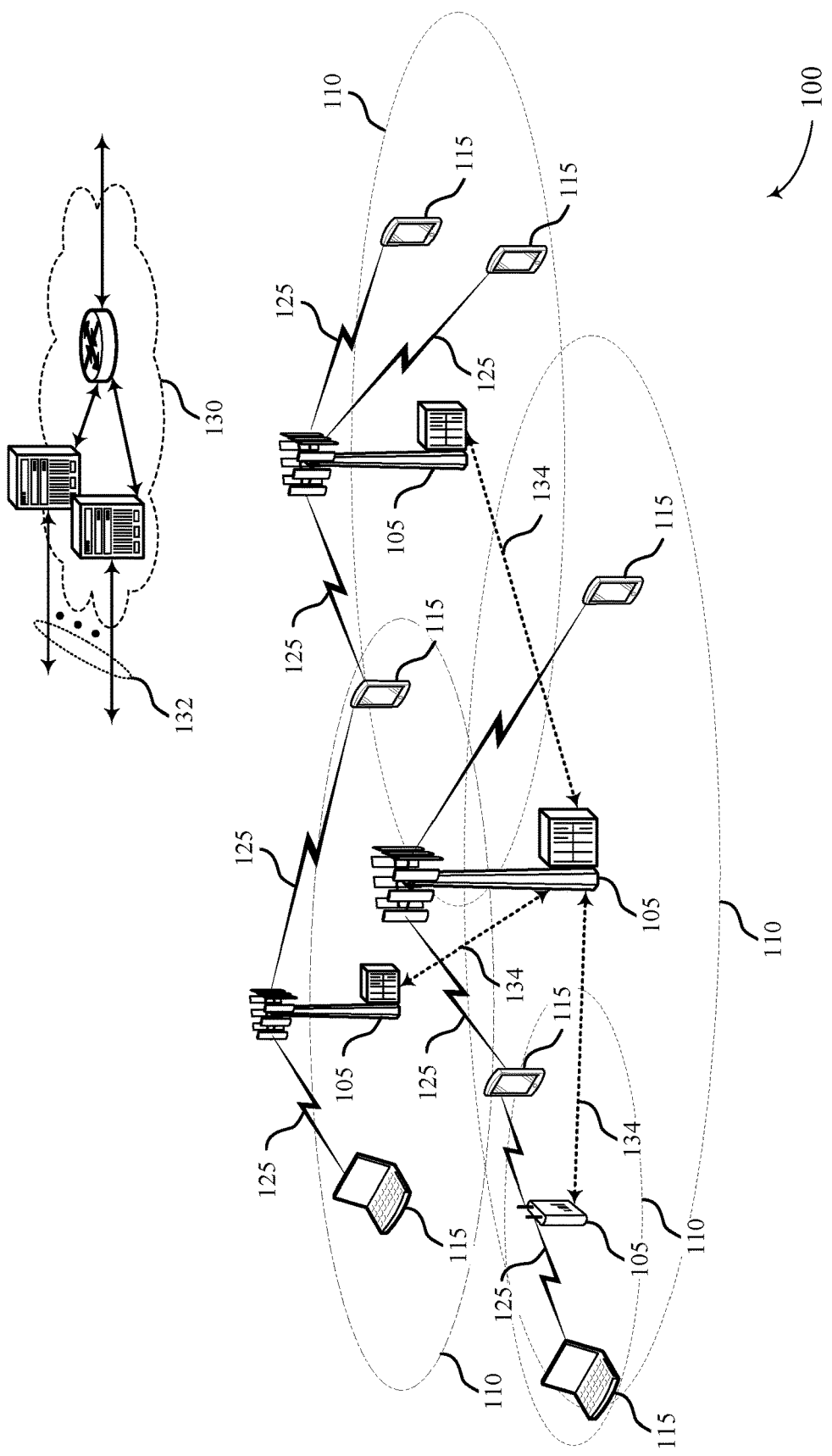
FIG. 1 illustrates an example of a system for wireless communication in accordance with aspects of the present disclosure.

In a wireless communications system, such as a millimeter wave (mmW) system or a New Radio (NR) system, a base station and a user equipment (UE) may utilize directional transmissions during a paging procedure. In some cases, a base station may transmit a paging indication (e.g., a paging notification) to one or more UEs by sweeping through a set of beams. Transmitting the paging indication by sweeping through a set of beams enables transmission of the paging indication to idle-state or radio resource control (RRC)-inactive UEs for which the best beam(s) on which to transmit to the one or more UEs may not be known by the base station. In some cases, the paging indication may be a group-based paging indication or hash compression-based paging indication. Instead of transmitting paging information with the paging indication, or transmitting paging information by sweeping through another set of beams following transmission of the paging indication, the base station may provide the one or more UEs with an indication of uplink transmission resources allocated for paging responses. In some cases, the uplink transmission resources may be group-based or hash compression-based. In some examples, the paging indication includes a search space (e.g., one or more slots or subframes) to be monitored by the one or more UEs for a subsequent paging message transmitted to the one or more UEs.

In some examples, an indication of the uplink transmission resources and the search space may be transmitted to the one or more UEs simultaneously with synchronization signals. In other examples, the indication of the uplink transmission resources and the search space may be transmitted to the one or more UEs separately from synchronization signals. A UE that receives a paging indication may transmit a paging response to the base station on at least one of the uplink transmission resources allocated for the paging responses. The paging response may then be transmitted by the UE on a beam. The base station may receive paging responses from one or more of the UEs using a beam sweep, and may transmit paging information to a UE on a beam on which the UE's paging response was received, using one or more resources indicated in the search space. The base station may be aware of a direction of the UE because of the beam on which the UE's paging response was received. This known direction may be used subsequently to transmit the paging information to the UE. The paging information may carry a larger amount of information than the paging indication, and thus require more time, power, and/or air resources to transmit. By transmitting the paging indication as described above, the paging information may be transmitted in a directional manner, instead of by sweeping through a set of beams, achieving savings in time, power consumption, and/or air resource use.

Aspects of the disclosure are initially described in the context of a wireless communications system. Aspects of the disclosure are further illustrated by and described with reference to apparatus diagrams, system diagrams, and flowcharts that relate to uplink transmission parameter selection for random access initial message.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) Gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched Streaming Service (PSS).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some examples, one or more of the UEs 115 may be paged by a base station 105. For example, the base station 105 may transmit a paging indication (e.g., a paging notification) to the one or more UEs 115 by sweeping through a set of beams. Instead of transmitting paging information with the paging indication, or transmitting paging information by sweeping through another set of beams following transmission of the paging indication, the base station 105 may provide the one or more UEs 115 with an indication of uplink transmission resources allocated for paging responses (e.g., the paging indication). In some examples, the paging indication includes a search space (e.g., one or more slots or subframes) to be monitored by the one or more UEs 115 for a subsequent paging message. A UE 115 that receives a paging indication may transmit a paging response to the base station 105 on at least one of the uplink transmission resources allocated for the paging responses. The paging response may be transmitted on a beam. The base station 105 may receive paging responses from one or more of the UEs 115 using a beam sweep, and may transmit paging information to a UE 115 on a beam on which the UE's paging response was received, or another beam, using one or more resources indicated in the search space.

Figure 2:
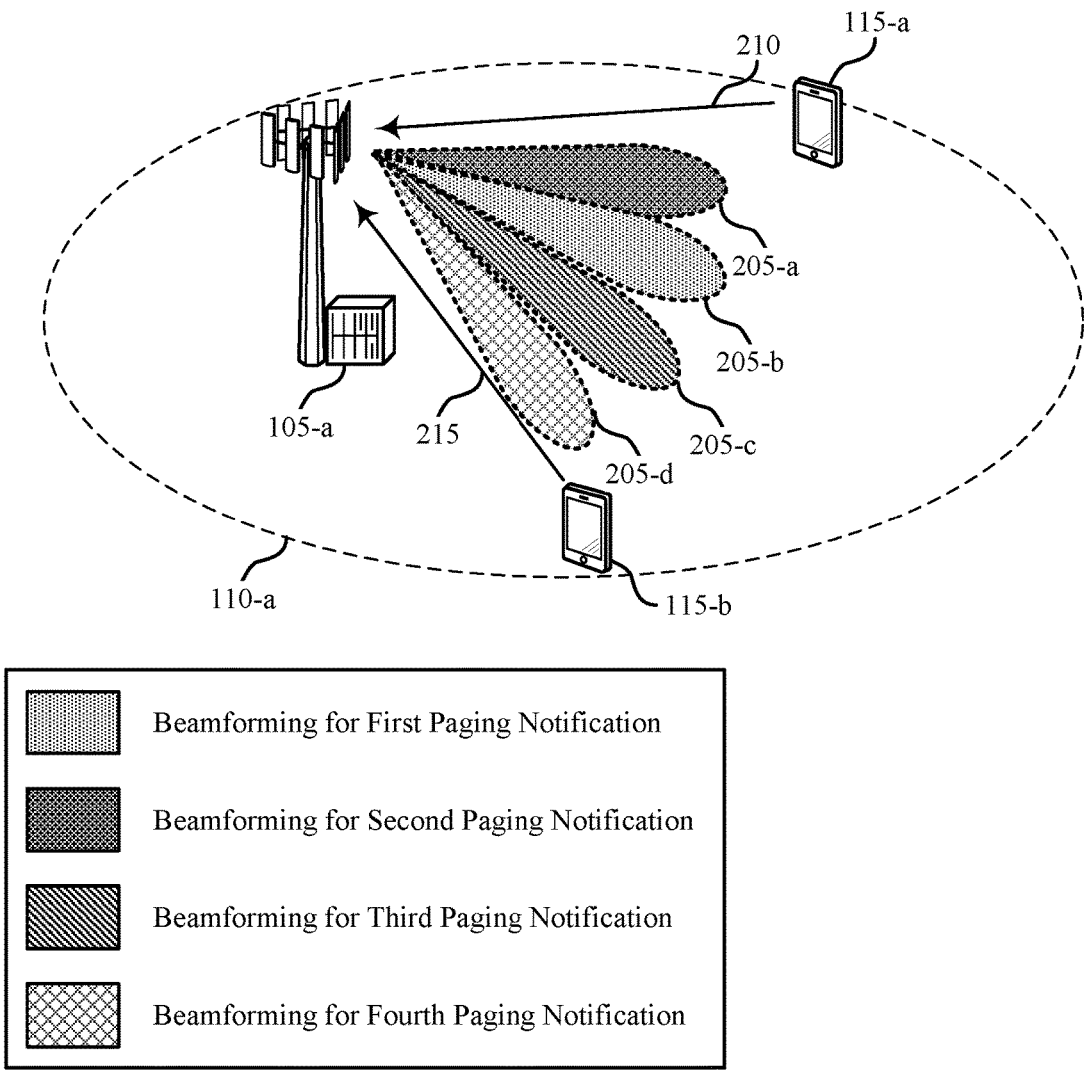
FIG. 2 illustrates an example of a system for wireless communication in accordance with aspects of the present disclosure.

FIG. 2 illustrates an example of a wireless communications system 200 in accordance with various aspects of the present disclosure. Wireless communications system 200 may include first UE 115-a, second UE 115-b, and base station 105-a, which may be examples of the corresponding devices described with reference to FIG. 1.

In a mmW system, base station 105-a and UEs 115 may utilize directional transmissions for communications. In some cases, base station 105-a may not be aware of the locations of UEs 115, and in the event that paging information is to be transmitted to the UEs 115, the base station 105-a may transmit multiple paging indications in a beam sweeping manner (e.g., by sweeping through a set of beams) to notify the UEs 115 of a page. The paging indication may be transmitted in a broadcast channel. In some examples, the paging indications may be transmitted as part of (or with) a synchronization signal (e.g., a primary synchronization signal (PSS), a secondary synchronization signal (SSS), a beam reference signal (BRS), an extended synchronization signal (ESS), a physical broadcast channel (PBCH), etc.) during a synchronization subframe. For example, the synchronization subframe may include a number of symbols (e.g., 1, 8, 14, 20 symbols).

Base station 105-a may transmit a directional synchronization signal including a paging indication in different directions, for example, by including a paging indication in each symbol. In other examples, different channels may be used for paging indications, and the discussion of paging indications as part of a synchronization signal are provided with the understanding that such techniques may be applied to other types of transmissions, such as other broadcast transmissions. Each directional synchronization signal may be transmitted in a different direction and on a different beam 205 in order to cover a portion of or all of coverage area 110-a of base station 105-a. For example, base station 105-a may transmit a first paging indication in a synchronization signal over beam 205-a in a first symbol, a second paging indication in a synchronization signal over beam 205-b in a second symbol, a third paging indication in a synchronization signal over beam 205-c in a third symbol, and a fourth paging indication in a synchronization signal over beam 205-d in a fourth symbol of a synchronization subframe. It should be understood that base station 105-a may transmit any number of directional paging indication signals without departing from the scope of the disclosure. In some examples, the paging indication includes a search space for a subsequent paging message. The search space may include, in some examples, one or more slots or subframes to be monitored for the paging message.

The first UE 115-a may receive the paging indication (e.g., over beam 205-a), and may transmit a first paging response 210 in an uplink transmission responsive to the paging indication. In some cases, first UE 115-a may receive multiple paging indications over multiple synchronization signals from base station 105-a, and may select one of the received signals to determine a base station beam and find the corresponding uplink resource for transmission (e.g., of the paging response 210). For example, the selection may be based on a received signal strength (e.g., reference signal received power (RSRP), received signal strength indication (RSSI), channel quality indicator (CQI), signal to noise ratio (SNR), etc.) of the received directional signal. Similarly, the second UE 115-b may receive the paging indication (e.g., over beam 205-d), and UE 115-b may transmit a second paging response 215 in an uplink transmission responsive to the paging indication. A paging response may explicitly or implicitly indicate one or more directional beams and/or resources used for the uplink paging response or, in some cases, may explicitly or implicitly indicate one or more directional beams and/or resources to be used by the base station for subsequent downlink communications (e.g., control transmissions, etc.). For example, the paging response may explicitly convey (e.g., via included information bits) one or more beam IDs, resources, or index values corresponding to resources included in the indication of uplink transmission resources for paging responses (e.g., previously received from the base station). Alternatively, the paging response may refer to an acknowledgment (e.g., an implicit indication). In such cases, the paging response may resemble an acknowledgment sent along a particular beam direction, such that the base station may use the beam direction or beam ID associated with the received paging response for subsequent downlink communications.

Base station 105-a may listen for paging response signals using beam sweep techniques to identify paging responses from different directions (e.g., the base station may beam sweep a physical downlink control channel (PDCCH) according to a search space). For example, base station 105-a may receive the first paging response 210 from the first UE 115-a and identify that the first UE 115-a may be served over beam 205-a. Likewise, base station 105-a may receive the second paging response 215 from the second UE 115-b and identify that the second UE 115-b may be served over beam 205-d. The base station 105-a may transmit a directional control channel transmission to the first UE 115-a using the beam 205-a and a directional control channel transmission to the second UE 115-b using beam 205-d. The control channel transmission may include an indication of resources for a subsequent shared channel transmission with paging data that is to be monitored by the UEs 115. In some cases, the base station 105-a may transmit additional or alternate transmissions using the identified beams used for transmission of the paging responses by UEs 115. For example, the base station may transmit data or physical downlink shared channel (PDSCH) transmissions directionally using the beam identified from a paging response. In some examples, base station 105-a may identify one or more groups of UEs 115 that may receive control channel transmissions and shared channel transmissions using the same resources. In cases where the paging indication includes search space information, the base station 105-a may not need to transmit the directional control channel transmissions, and may transmit the subsequent shared channel transmission with paging data using one or more resources indicated in the search space responsive to receiving the paging response signals. In other cases, search space information may be predetermined or specified by the network.

Figure 3:
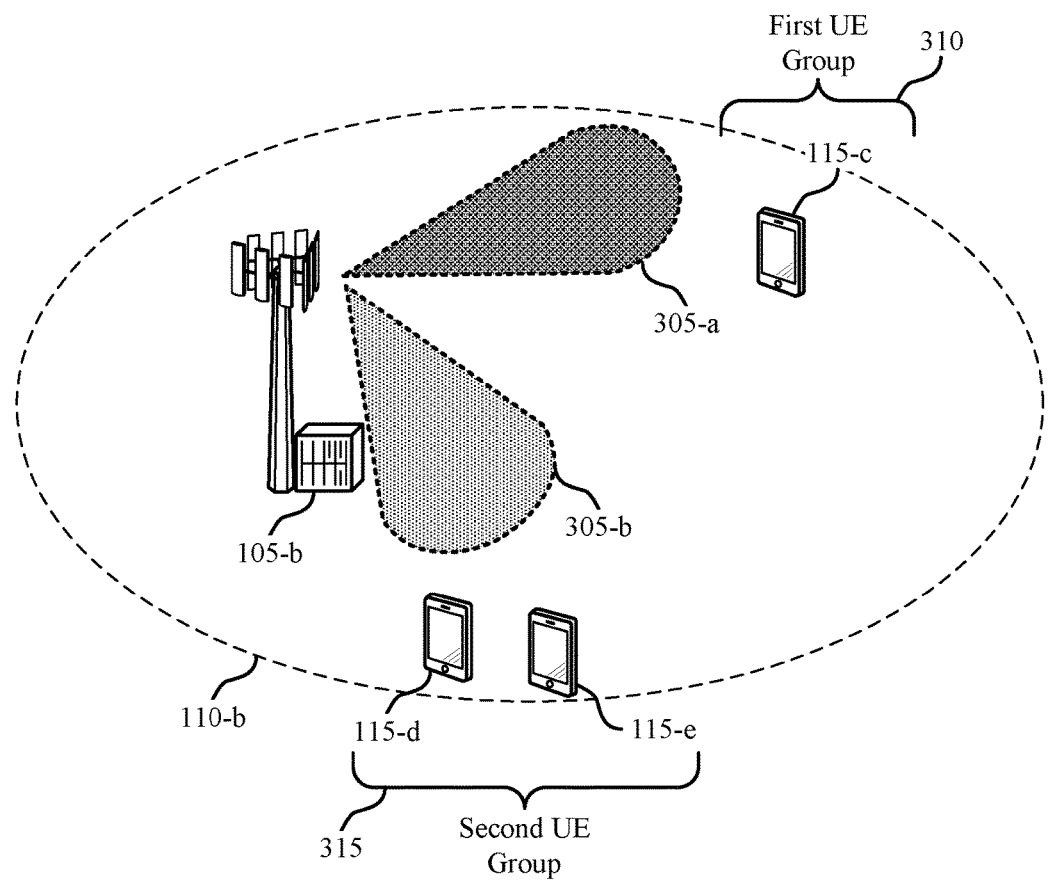
FIG. 3 illustrates an example of a system that supports wireless communication for multiple groups of user equipment (UEs) in accordance with aspects of the present disclosure.
Figure 3:
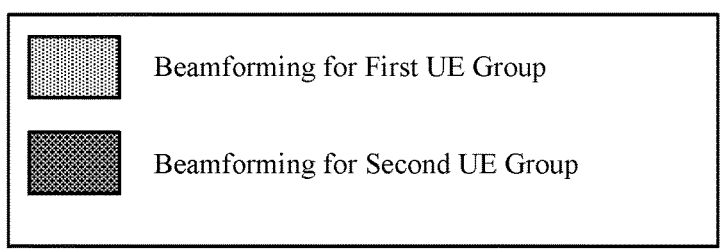

FIG. 3 illustrates an example of a wireless communications system 300, that may include multiple groups of UEs, conveying paging group information through control channel transmissions. Wireless communications system 300 may include a number of UEs 115, and base station 105-b, which may be examples of the corresponding devices described with reference to FIG. 1.

In this example, base station 105-b and UEs 115 may utilize directional transmissions for communications within coverage area 110-b of base station 105-b. One or more UEs 115 in this example may be grouped onto a first UE group 310 that may be served by directional beam 305-a and a second UE group 315 that may be served by directional beam 305-b. In some examples, the base station 105-b may group the UEs 115 into the first UE group 310 and second UE group 315 based on paging responses received from the UEs 115, as discussed above. In some cases, the base station 105-b may indicate a specific group of UEs 115 through a control channel transmission, and transmit the control channel transmission using a directional beam, or set of directional beams, to the direction(s) where the paging responses of this group came from. In the example of FIG. 3, the base station 105-b may identify a paging response from UE 115-c that may be included in the first UE group 310 that may be served by first directional beam 305-a. The base station 105-b may identify paging responses from UE 115-d and UE 115-e that may be included in the second UE group 315 that may be served by second directional beam 305-b. The control channel transmissions may indicate, for example, shared channel resources of a subsequent shared channel transmission that are to be monitored by the UEs within a UE group.

The base station 105-b may then transmit paging information for each UE group 310 and 315 in a subsequent data channel in the subsequent shared channel transmission. The paging information may notify a UE 115 about various events such as, for example, data to be transmitted to the UE 115 when in an idle state, system information change notifications, or an alert event (e.g., commercial mobile alert system (CMAS) messages, earthquake and tsunami warning system (ETWS) messages, public warning system (PWS) messages, etc.). In some examples, the control channel transmissions may not indicate group information for the first UE group 310 or the second UE group 315. In such cases, each UE 115 may decode each subsequent shared channel transmission that may include paging information to determine if the paging information in the transmission is intended for the UE. In some cases, group information may not be included in a control channel transmission when the subsequent paging information is to be transmitted relatively soon after the control channel transmission and such monitoring by the UEs 115 is likely to use relatively little additional power. In some cases, group information may be included in the control channel transmissions when the subsequent paging information is to be transmitted after a relatively long period of time, and the UE 115 may discontinue monitoring for a period of time between the control channel transmission and the subsequent data channel transmission to conserve power.

The control channel transmissions with UE group information may thus be used in such examples to further enhance system efficiency and UE operation. In legacy LTE systems, for example, paging messages may follow immediately with paging indicator, and no UE response is needed to get a full paging message. However, when using beam sweep techniques for a paging indication, resources to provide a full paging message may require additional resources for each directional beam transmitted, many of which may not be received at a UE that is the subject of such a paging message. Thus, providing an initial paging indication followed by a control channel transmission directed to UE groups of interest may provide more efficient use of resources for systems that use directional transmissions. Furthermore, providing UE group information in a control channel transmission may also allow a UE 115 to ignore an overlapping beam of a UE from a different UE group. In some cases, the base station 105-b may intentionally address multiple groups of UEs using a union of two or more beams, and the control channel can also indicate multiple groups in the content.

Figure 4:
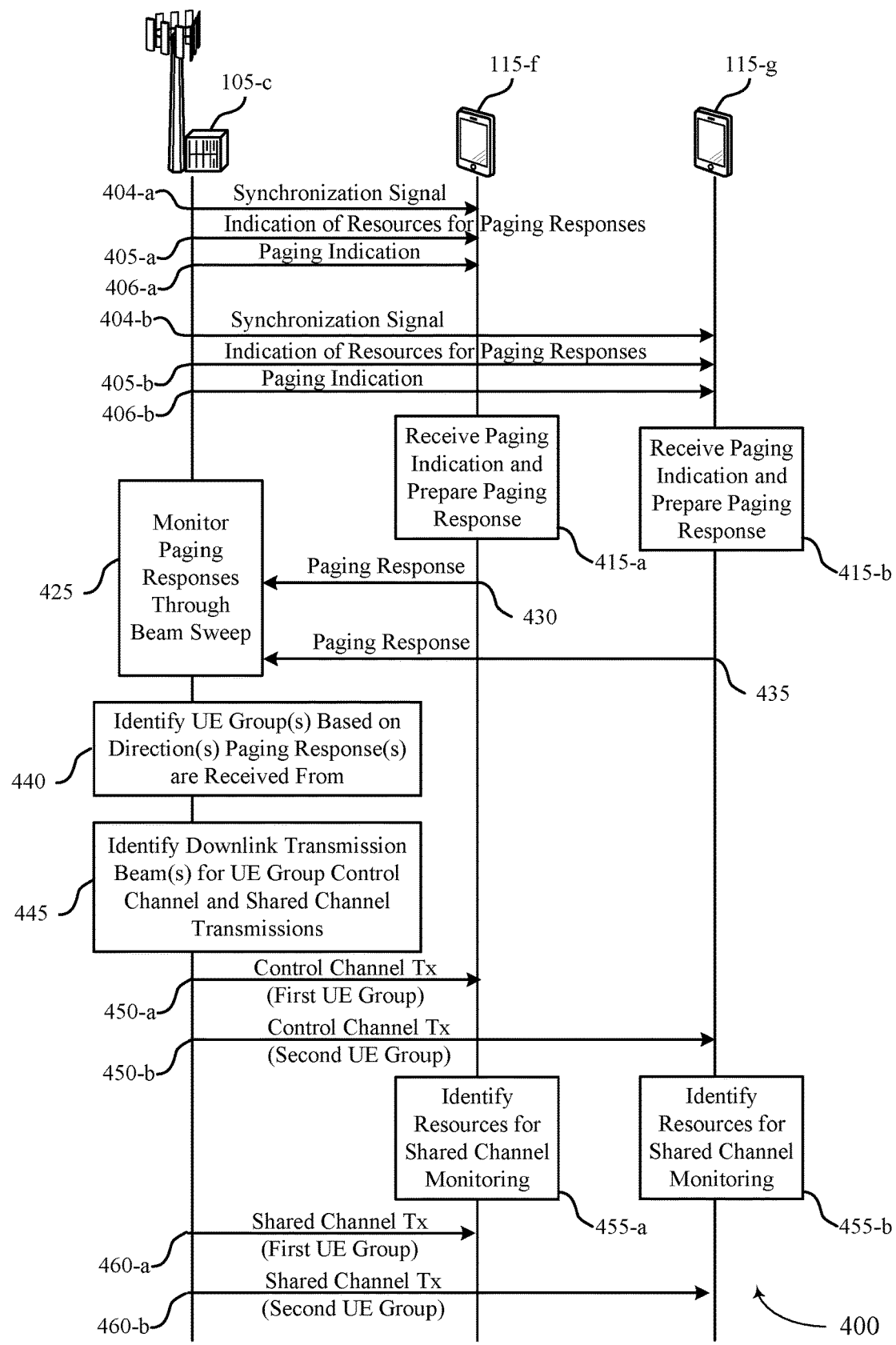
FIG. 4 illustrates an example of a process flow that supports conveying paging group information through control channel transmissions in accordance with aspects of the present disclosure.

FIG. 4 illustrates an example of a process flow 400 for conveying paging group information through control channel transmissions. Process flow 400 may include a first UE 115-f, a second UE 115-g, and base station 105-c, which may be respective examples of a UE 115 and a base station 105 as described with reference to FIGS. 1, 2, and 3. Alternative examples of the following may be implemented, where some steps are performed in a different order or not at all. Some steps may additionally include additional features not mentioned above.

Base station 105-c may transmit (e.g., broadcast) synchronization signals 404, an indication of uplink transmission resources allocated for paging responses 405, and paging indications 406. In this example, a first synchronization signal 404-a, a first indication of uplink transmission resources allocated for paging responses 405-a, and a first paging indication 406-a may be transmitted through a first directional beam, and a second synchronization signal 404-b, a second indication of uplink transmission resources allocated for paging responses 405-b, and a second paging indication 406-b may be transmitted through a second directional beam. Some examples may rearrange the order of some of the steps shown here (e.g., 405-a may occur before 404-a). The synchronization signals 404 may carry timing information that enables the UEs 115 to synchronize communications with the base station 105-c. The indications of uplink transmission resources allocated for paging responses 405 may indicate uplink transmission resources to be used for transmitting paging responses to paging indications received on different directional beams. The paging indications 406 may include one or more bits that may indicate to a UE 115 that paging information is to be transmitted to the UE 115. In some examples, the resources allocated for paging responses may include resources of a random access channel or a scheduling request channel.

In some examples, one or more of the synchronization signals 404, indications of uplink transmission resources allocated for paging responses 405, or paging indications 406 may be transmitted by sweeping through a set of beams. In some examples, one or more of the synchronization signals 404, indications of uplink transmission resources allocated for paging responses 405, or paging indications 406 may be transmitted by sweeping through a same set of beams or different sets of beams (e.g., in a single beam sweep or in multiple beam sweeps). Thus, in some cases, two or more of the transmissions at 404, 405, or 406 may be combined. In some examples, one or more of the synchronization signals 404, indications of uplink transmission resources allocated for paging responses 405, or paging indications 406 may be transmitted over at least one of a synchronization channel, a broadcast channel, a control channel, a RRC channel, or a combination thereof. In some examples, the indications of uplink transmission resources allocated for paging responses 405 and paging indications 406 may be transmitted on a same channel. In some examples, the paging indications 406 may include a search space for a subsequent paging message in a shared channel transmission. The search space may include, in some examples, one or more slots or subframes to be monitored for the paging message.

In some examples, the indications of uplink transmission resources allocated for paging responses 405 may be transmitted over a broadcast channel simultaneously with (e.g., within the same subframe or TTI as) the synchronization signals 404 by sweeping through a set of beams. In other examples, the base station 105-c may transmit the synchronization signals 404 by sweeping through a first set of beams, and may transmit the indications of uplink transmission resources allocated for paging responses 405 over a broadcast channel by sweeping through a second set of beams.

In some examples, the paging indications 406 may be group-based. For example, UEs 115 may be split into groups of NUEs, and the base station 105-c may transmit a bit to notify each group of NUEs of a page. In some examples, hash-based compression may be used. With hash-based compression, the UEs may be split into fewer groups of N' UEs (and in some cases one group), and the base station 105-c may transmit M bits to notify each group of a page. Typically, N'>N and M>1. In some examples, the uplink transmission resources allocated for paging responses may include a set of one or more resources allocated for a group-based paging response. The group-based paging response may include paging responses from a group of UEs 115. In some examples, the one or more resources allocated for the group-based paging response may be allocated for a hash compression-based paging response.

In some examples, the base station 105-c may allocate a number of opportunities for paging responses within a time interval and frequency range of the uplink transmission resources allocated for paging responses (and may inform UEs of the number of opportunities in the indication of uplink transmission resources allocated for paging responses 405). The number of opportunities may be allocated based at least in part on a presence or absence of time synchronization of UEs 115 within a coverage area of the base station 105-c. In some examples, allocating the number of opportunities for paging responses may include allocating relatively more opportunities for paging responses for a first set of UEs that is time-synchronized, allocating relatively fewer opportunities for paging responses for a second set of UEs that is not time-synchronized, or a combination thereof. In some examples, allocating the number of opportunities for paging responses may include allocating a first set of opportunities for paging responses for a first set of UEs that is time-synchronized, and allocating a second set of opportunities for paging responses for a second set of UEs that is not time-synchronized. In some examples, the number of opportunities may include at least one of subcarrier regions, cyclic shifts, time slots, root sequences, or combinations thereof.

At block 415, UEs 115 may wake up, receive the paging indication 406 (if any), and prepare a paging response. For example, first UE 115-f may receive the first paging indication 406-a through the first directional beam and prepare a paging response. Likewise, second UE 115-g may receive the second paging indication 406-b through the second directional beam and prepare a paging response. The paging response for each UE 115 may be one or more bits to be transmitted on the indicated uplink transmission resources for a paging response (e.g., resources that may be assigned in a receive sweeping subframe of the base station 105-a, such as a random access channel (RACH) sweeping subframe or a separate paging response sweeping subframe). In some examples, a UE may select at least one uplink transmission resource on which to transmit a paging response by selecting from a number of opportunities for paging responses within a time interval and frequency range of the uplink transmission resources allocated for paging responses 405.

At block 425, the base station 105-c, may monitor for paging responses through beam sweep (e.g., by sweeping through a set of beams). The first UE 115-f may transmit a first paging response 430 using a directional beam and resources identified based at least in part on the first indication of uplink transmission resources for paging responses 405-a and the first paging indication 406-a, and the second UE 115-g may transmit a second paging response 435 using a directional beam and resources identified based at least in part on the first indication of uplink transmission resources for paging responses 405-b and the second paging indication 406-b.

At block 440, the base station 105-c may identify one or more UE groups based on one or more directions from which paging responses are received. In some cases, two or more UEs 115 may be identified as providing a paging response within a particular directional beam or within a set of adjacent directional beams, and may be grouped into a UE group for control channel and subsequent shared channel transmissions. For example, base station 105-c may receive, from a set of UEs 115, a set of paging responses on a set of different transmission resources for uplink paging responses that are included in a set of transmission resources allocated for paging responses. In some cases, the base station 105-c may identify a first subset of the set of UEs 115 as being in a first paging group, and identify a second subset of the set of UEs as being in a second paging group. In some cases, the paging group information includes information indicating the two or more paging groups are to monitor the subsequent data channel transmission.

At block 445, the base station 105-c may identify one or more downlink transmission beams for one or more UE group control channel and shared channel transmissions. In some examples, the one or more downlink transmission beams may be identified based on a direction of the paging responses from the UEs 115, with the downlink transmission beams selected to provide directional transmissions to the UEs 115.

The base station 105-c may transmit control channel transmissions 450 for each UE group. As discussed above, the control channel transmissions 450 may include an indication of shared channel resources to be monitored for UEs 115 within a UE group. In the example of FIG. 4, the base station 105-c may transmit a first control channel transmission 450-a to a first UE group that may include first UE 115-f using a first directional beam, and may transmit a second control channel transmission 450-b to a second UE group that may include second UE 115-g using a second directional beam. In examples where the paging indications 406 indicate a search space for a subsequent paging message, one or more of the control channel transmissions 450 may be skipped (e.g., not transmitted).

The UEs 115 may receive the control channel transmissions, and at block 455 identify resources for monitoring of shared channel transmissions. In cases, where the paging indications 406 include search space information, the UEs 115 may identify resources from the search space for monitoring of shared channel transmissions. As discussed above, the shared channel resources may be indicated in the control channel transmissions and UEs 115 within a UE group may monitor shared channel resources identified for the particular UE group and thus avoid monitoring of shared channel transmissions that will not include paging information for UEs 115 of that particular UE group. The base station 105-c may then transmit the shared channel transmissions 460, which may include a first shared channel transmission 460-a to a first UE group that may include first UE 115-f, and a second shared channel transmission 460-b to a second UE group that may include second UE 115-g. The first shared channel transmission 460-a may be transmitted using a first beam, and the second shared channel transmission 460-b may be transmitted using a second beam. The UEs 115 may receive the respective shared channel transmissions, and decode the paging information. Some examples may rearrange the order of some of the steps shown here (e.g., control and data for UE 115-f or a group associated with UE 115-f may go through a first slot, and control and data for UE 115-e or a group associated with UE 115-e may go through a second slot, that is, in some examples steps may be performed in the order of 450-a, 460-a, 450-b, 460-b).

Figure 5:
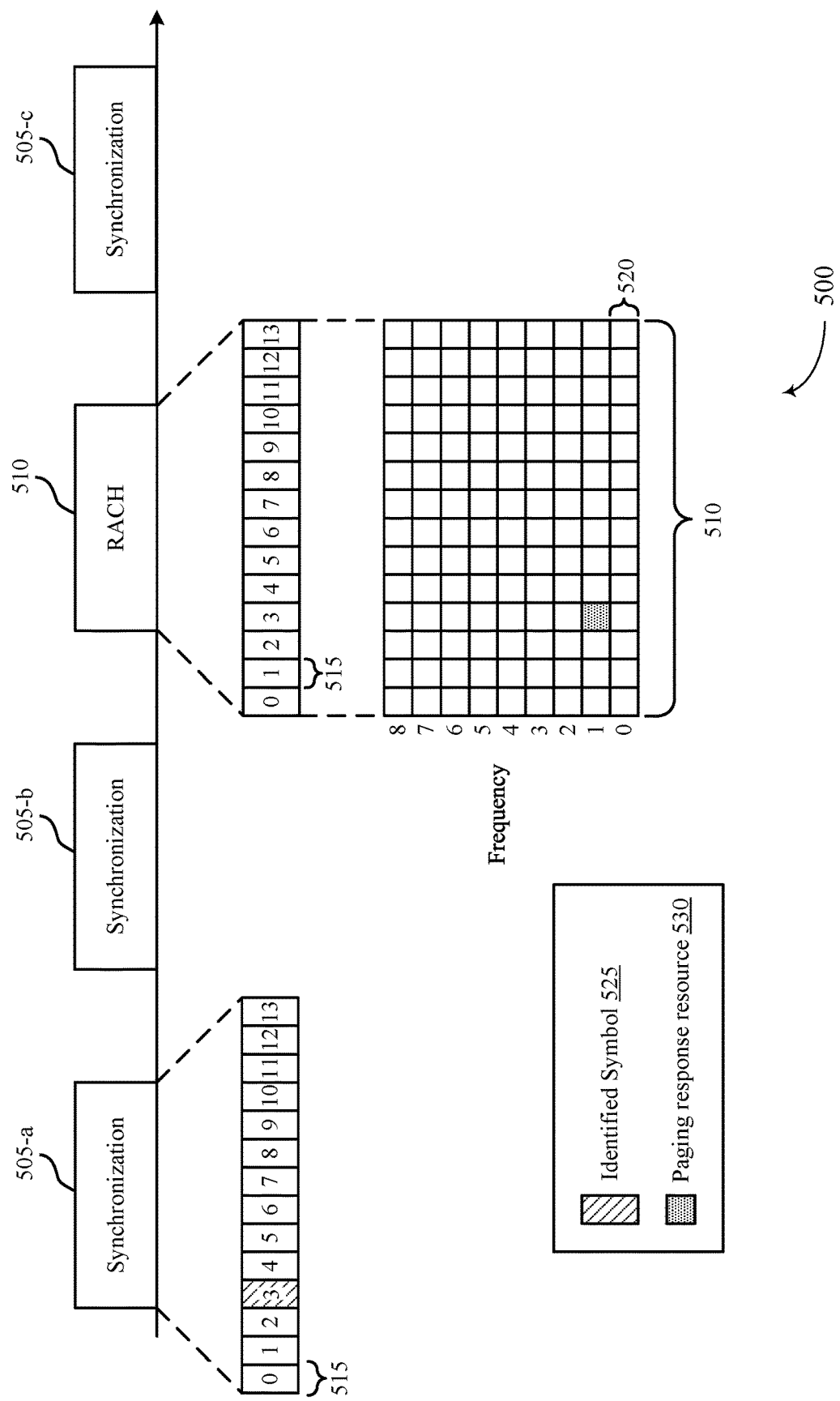
FIG. 5 illustrates an example of paging in combination with random access in accordance with aspects of the present disclosure.

FIG. 5 illustrates an example timeline 500 of paging in combination with random access in accordance with various aspects of the present disclosure. The timeline 500 may include synchronization subframes 505 (e.g., synchronization subframes 505-a, 505-b, and 505-c) and RACH subframes 510 (e.g., RACH slots). Both types of subframes may include one or more symbols 515. Paging and random access may be performed using the synchronization subframes 505 and RACH subframes 510 as described with reference to FIGS. 1-4.

In some cases, a base station 105 may transmit multiple directional synchronization signals during synchronization subframe 505-a, simultaneously with an indication of uplink transmission resources allocated for paging responses and/or paging indications. For example, the base station 105 may transmit a directional synchronization signal with an indication of uplink transmission resources allocated for paging responses and/or paging indications during multiple symbols 515 (e.g., during each symbol 515) of synchronization subframe 505-a. Each set of directional signals and/or indications may be transmitted over a different beam in a different direction. For example, synchronization subframe 505-a may contain fourteen symbols 515. The base station 105 may divide a coverage area (or a portion of a coverage area) into sections (e.g., fourteen sections corresponding to illustrated RACH subframe 510 having fourteen symbols 515) and transmit each set of directional signals and/or indications on separate beams, each beam directed to one of the sections.

The UE 115 may receive one or more sets of directional signals and/or paging indications from the base station 105, and may select one of the sets. For example, the UE 115 may select the set with the greatest received signal strength (e.g., RSSI, RSRP, CQI, etc.). The UE 115 may identify the symbol (e.g., symbol 525) and the corresponding beam over which the UE 115 received the selected set. In some cases, the UE 115 may randomly select a subcarrier region from the subcarrier frequencies 520 for transmission of a paging response, or may select a subcarrier region (or cyclic shift, or time slot, root sequence, or combination thereof) allocated for use based on whether the UE 115 is time-synchronized or not time-synchronized with the base station 105. The UE 115 may transmit a directional paging response to the base station 105 using the selected resource 530, during the identified symbol 525 and over the selected subcarrier region.

The base station 105 may receive the directional paging response during the RACH subframe 510. In response, the base station 105 may transmit directional paging information to the UE 115.

Figure 6:
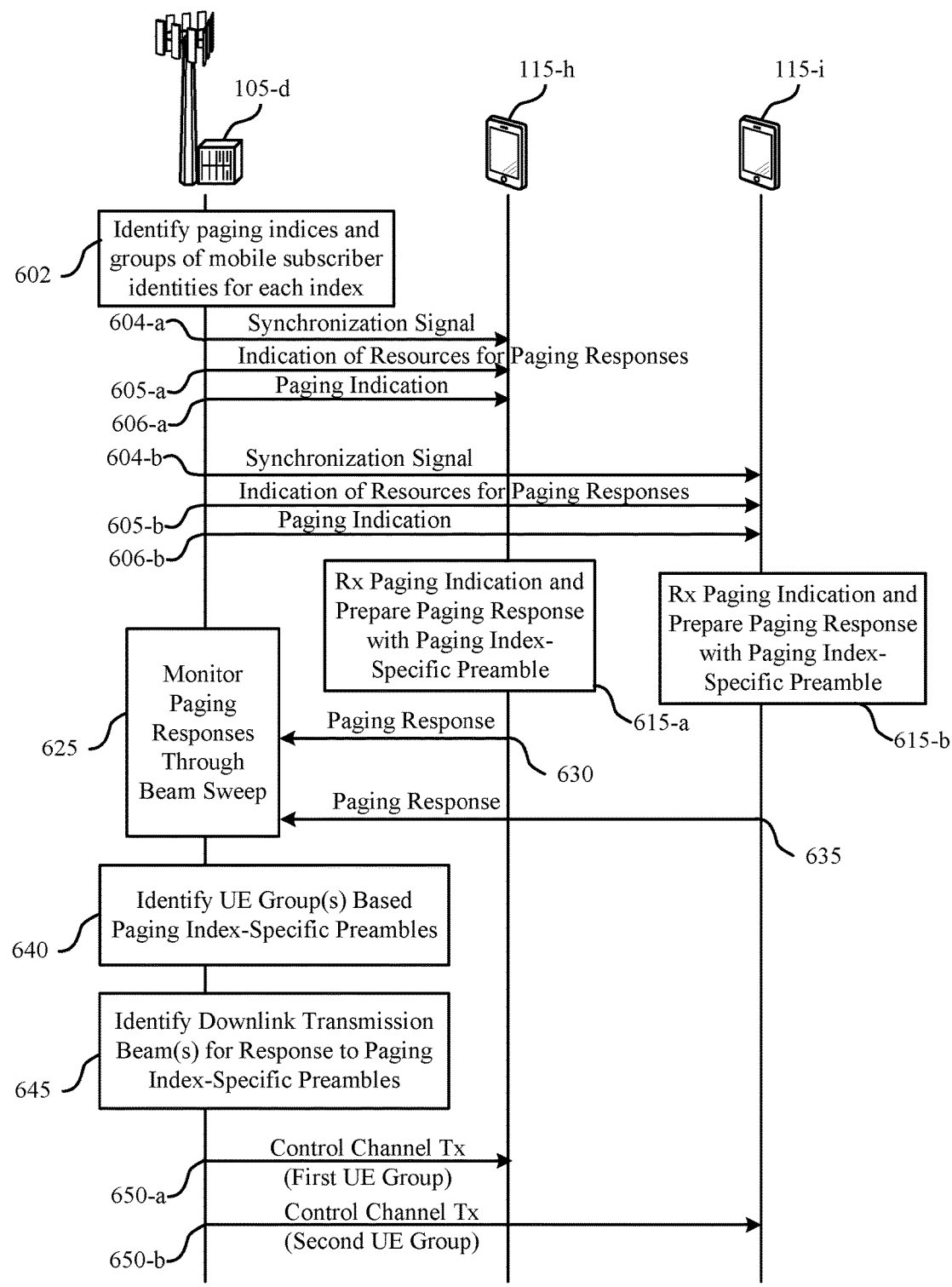
FIG. 6 illustrates an example of a process flow that supports conveying paging group information through control channel transmissions in accordance with aspects of the present disclosure.

FIG. 6 illustrates an example of a process flow 600 for conveying paging group information through control channel transmissions. Process flow 600 may include a first UE 115-$h$, a second UE 115-$i$, and base station 105$d$, which may be respective examples of a UE 115 and a base station 105 as described with reference to FIGS. 1, 2, and 3.

At block 602, the base station 105-$d$ may identify paging indices and groups of mobile subscriber identities for each index. In some cases, the base station 105-$d$ may receive a paging record list containing user identities of paged UEs (e.g., S-TMSI or IMSI) from a paging agent that may be part of a core network, for example.

The base station 105-$d$ may transmit (e.g., broadcast) synchronization signals 604, an indication of uplink transmission resources allocated for paging responses 605, and paging indications 606. In this example, a first synchronization signal 604-$a$, a first indication of uplink transmission resources allocated for paging responses 605-$a$, and a first paging indication 606-$a$ may be transmitted through a first directional beam, and a second synchronization signal 604-$b$, a second indication of uplink transmission resources allocated for paging responses 605-$b$, and a second paging indication 606-$b$ may be transmitted through a second directional beam. The synchronization signals 604 may carry timing information that enables the UEs 115 to synchronize communications with the base station 105-$d$. In some cases, the resources for paging responses may be configured in advance (e.g., 605-$a$ and 605-$b$ may be omitted from process flow 600 in some examples, as information of 605-$a$ and 605-$b$ may have previously been configured).

The indications of uplink transmission resources allocated for paging responses 605 may indicate uplink transmission resources to be used for transmitting paging responses to paging indications received on different directional beams. In some examples, the paging indications 606 may include a paging index associated with a group of mobile subscriber identities. In some cases, the uplink transmission resources allocated for paging responses may include uplink transmission resources allocated to each of the paging indices, representing groups of mobile subscriber identities. In some examples, the resources allocated for paging responses may include resources of a random access channel or a scheduling request channel. In some cases, a 10-bit UE-Identity Index Value may be used as a paging index, and indicator-based paging may be used for S-TMSI- as well as IMSI-based pages. In some cases, a single bit may be included with each paging opportunity which indicates if IMSI-based pages are present. As IMSI-based paging occurs relatively infrequently, such one-bit indicators may help reduce false-alerts for IMSI-based matches.

In some examples, one or more of the synchronization signals 604, indications of uplink transmission resources allocated for paging responses 605, or paging indications 606 may be transmitted by sweeping through a set of beams, in a similar manner as discussed above.

At block 615, UEs 115 may wake up, receive the paging indication 606 (if any), and prepare a paging response with a paging index-specific preamble. For example, first UE 115-$h$ may receive the first paging indication 606-$a$ through the first directional beam and prepare a paging response. Likewise, second UE 115-$i$ may receive the second paging indication 606-$b$ through the second directional beam and prepare a paging response. The paging response for each UE 115 may be one or more bits to be transmitted on the indicated uplink transmission resources for a paging response.

At block 625, the base station 105$d$, may monitor for paging responses through beam sweep (e.g., by sweeping through a set of beams). The first UE 115-$h$ may transmit a first paging response 630 using a directional beam and resources identified based at least in part on the first indication of uplink transmission resources for paging responses 605-$a$ and the first paging indication 606-$a$, and the second UE 115-$i$ may transmit a second paging response 635 using a directional beam and resources identified based at least in part on the first indication of uplink transmission resources for paging responses 605-$b$ and the second paging indication 606-$b$. In some cases, the paging responses 630 and 635 may be transmitted on an uplink transmission resource allocated to the paging index. In some cases, the uplink transmission resources allocated for paging responses comprise uplink transmission resources allocated to each of a number of paging indices representing groups of mobile subscriber identities.

At block 640, the base station 105-$d$ may identify one or more UE groups based on one or more directions from which paging responses are received and the paging index specific preambles. In some cases, the base station 105-$d$ may respond to a paging index-specific preamble by sending the UE IDs that pertain to the paging index. At block 645, the base station 105-$d$ may identify one or more downlink transmission beams for response to the paging index-specific preambles. In some examples, the one or more downlink transmission beams may be identified based on a direction of the paging responses from the UEs 115 to provide directional transmissions to the UEs 115.

The base station 105-$d$ may transmit control channel transmissions 650 based on the identified UE groups and downlink transmission beams. In the example of FIG. 6, the base station 105-$d$ may transmit a first control channel transmission 650-$a$ to a first UE group that may include first UE 115-$h$ using a first directional beam, and may transmit a second control channel transmission 650-$b$ to a second UE group that may include second UE 115-$i$ using a second directional beam.

Figure 7:
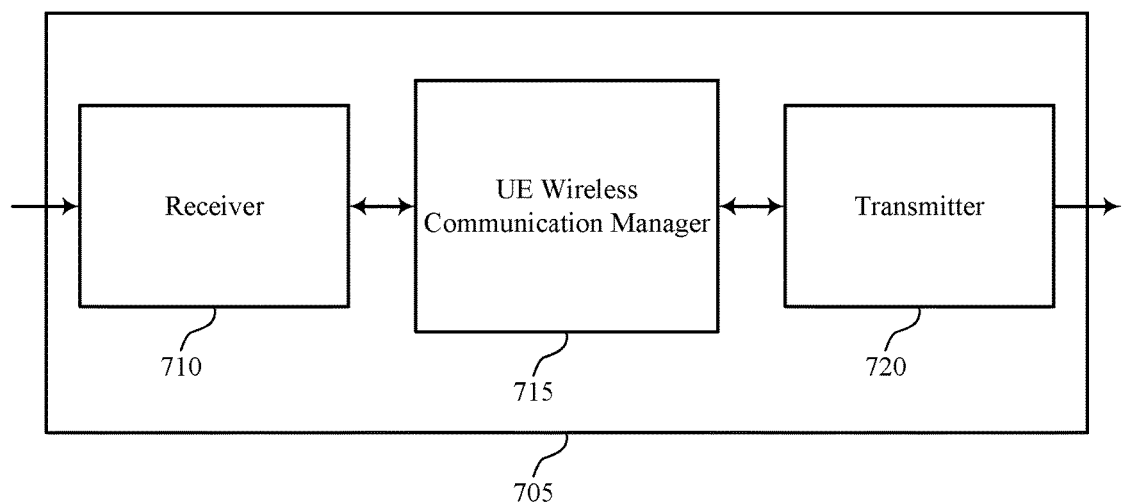
FIGS. 7 through 9 show block diagrams of a device that supports wireless communication in accordance with aspects of the present disclosure.

FIG. 7 shows a block diagram 700 of a wireless device 705 that supports wireless communication in accordance with various aspects of the present disclosure. Wireless device 705 may be an example of aspects of a UE as described with reference to FIGS. 1, 2, 4, and 6. Wireless device 705 may include receiver 710, UE wireless communication manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to synchronization, paging, random access, etc.). Information may be passed on to other components of the device. The receiver 710 may be an example of aspects of the transceiver 1035 described with reference to FIG. 10.

UE wireless communication manager 715 and/or at least some of its various sub-components may be implemented in hardware, software executed by a processor, firmware, or any combination thereof. If implemented in software executed by a processor, the functions of the UE wireless communication manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination The UE wireless communication manager 715 and/or at least some of its various sub-components may be physically located at various positions, including being distributed such that portions of functions are implemented at different physical locations by one or more physical devices. In some examples, UE wireless communication manager 715 and/or at least some of its various sub-components may be a separate and distinct component in accordance with various aspects of the present disclosure. In other examples, UE wireless communication manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE wireless communication manager 715 may be an example of aspects of the UE wireless communication manager 1050 described with reference to FIG. 10.

UE wireless communication manager 715 may receive a paging indication from a base station. UE wireless communication manager 715 may further transmit, to the base station, the paging response to the received paging indication. The paging response may be transmitted on at least one of the uplink transmission resources allocated for the paging response. In some examples, UE wireless communication manager 715 may first receive, from the base station, an indication of uplink transmission resources allocated for the paging response to the paging indication. In some examples, the UE wireless communication manager 715 may receive, from a base station, a paging indication, and transmit, to the base station, a paging response to the received paging indication. The paging response may be transmitted on at least one uplink transmission resource allocated for the paging response. In some examples, the paging indication includes a search space for a paging message to be transmitted in a subsequent shared channel transmission. The search space may include, in some examples, one or more slots or subframes to be monitored for the paging message.

Transmitter 720 may transmit signals generated by other components of the device. In some examples, the transmitter 720 may be collocated with the receiver 710 in a transceiver. For example, the transmitter 720 may be an example of aspects of the transceiver 1035 described with reference to FIG. 10. The transmitter 720 may include a single antenna, or it may include a set of antennas.

Figure 8:
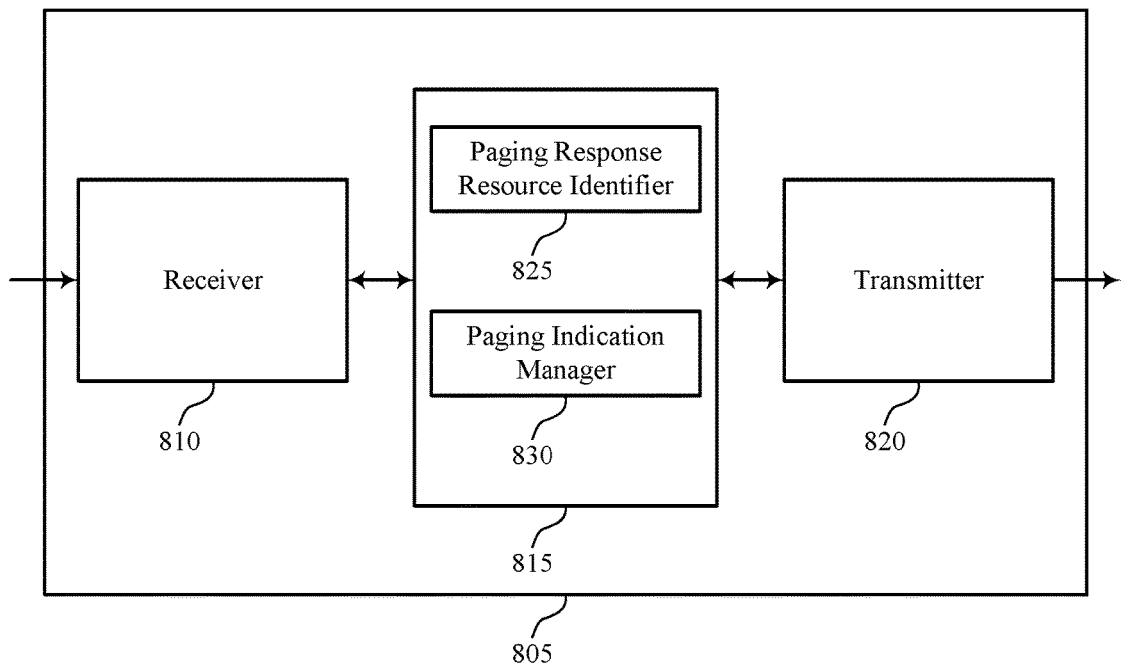

FIG. 8 shows a block diagram 800 of a wireless device 805 that supports wireless communication in accordance with various aspects of the present disclosure. Wireless device 805 may be an example of aspects of a wireless device or a UE as described with reference to FIGS. 1, 2, 4, and 6. Wireless device 805 may include receiver 810, UE wireless communication manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to synchronization, paging, random access, etc.). Information may be passed on to other components of the device. The receiver 810 may be an example of aspects of the transceiver 1035 described with reference to FIG. 10.

UE wireless communication manager 815 may include paging response resource identifier 825 and paging indication manager 830. UE wireless communication manager 815 may be an example of aspects of the UE wireless communication manager 1050 described with reference to FIG. 10.

Paging response resource identifier 825 may receive, from a base station, an indication of uplink transmission resources allocated for a paging response to a paging indication. Paging indication manager 830 may receive the paging indication from the base station.

Transmitter 820 may transmit signals generated by other components of the device. In some examples, the transmitter 820 may be collocated with the receiver 810 in a transceiver. For example, the transmitter 820 may be an example of aspects of the transceiver 1035 described with reference to FIG. 10. The transmitter 820 may include a single antenna, or it may include a set of antennas.

Figure 9:
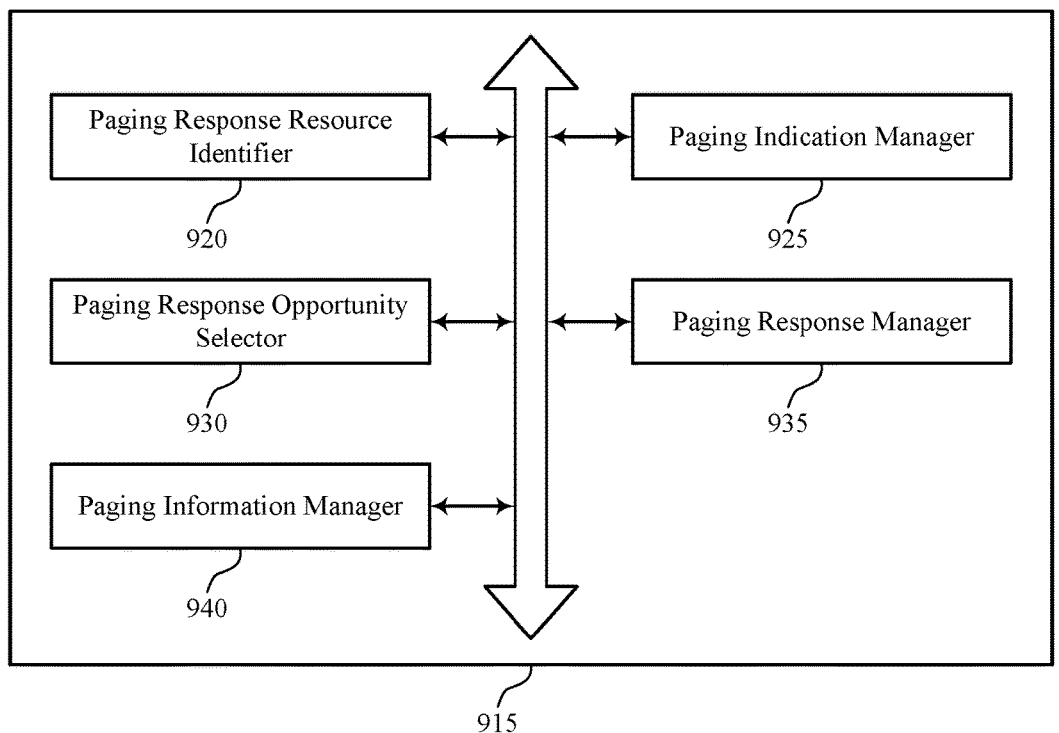

FIG. 9 shows a block diagram 900 of a UE wireless communication manager 915 in accordance with various aspects of the present disclosure. The UE wireless communication manager 915 may be an example of aspects of a UE wireless communication manager described with reference to FIGS. 7, 8, and 10. The UE wireless communication manager 915 may include paging response resource identifier 920, paging indication manager 925, paging response opportunity selector 930, paging response manager 935, and paging information manager 940. Each of these components may communicate, directly or indirectly, with one another (e.g., via one or more buses).

Paging response resource identifier 920 may receive, from a base station, an indication of uplink transmission resources allocated for a paging response to a paging indication. In some examples, receiving the indication of uplink transmission resources allocated for a paging response to a paging indication may include receiving the indication of uplink transmission resources allocated for the paging response over at least one of a synchronization channel, a broadcast channel, a control channel, a RRC channel, or a combination thereof. In some examples, the uplink transmission resources allocated for the paging response to the paging indication may include a set of one or more resources allocated for a group-based paging response. The group-based paging response may include paging responses from a group of UEs including a UE including the UE wireless communication manager 915. In some examples, the one or more resources allocated for the group-based paging response may be allocated for a hash compression-based paging response. In some examples, the uplink transmission resources allocated for the paging response to the paging indication may include resources of a random access channel or a scheduling request channel.

Paging indication manager 925 may receive the paging indication from the base station. In some examples, the paging indication and the indication of uplink transmission resources allocated for the paging response may be received on a same channel. In some examples, the paging indication includes a search space for a paging message to be transmitted in a subsequent shared channel transmission. The search space may include, in some examples, one or more slots or subframes to be monitored for the paging message.

Paging response opportunity selector 930 may select at least one of the uplink transmission resources on which to transmit the paging response by selecting from a number of opportunities for paging responses within a time interval and frequency range of the uplink transmission resources allocated for paging responses. The number of opportunities may be allocated (by a base station) based at least in part on a presence or absence of time synchronization of UEs within a coverage area of the base station. In some examples, the number of opportunities for paging responses may include relatively more opportunities for paging responses for a first set of UEs that is time-synchronized, relatively fewer opportunities for paging responses for a second set of UEs that is not time-synchronized, or a combination thereof. In some examples, the number of opportunities for paging responses may include a first set of opportunities for paging responses for a first set of UEs that is time-synchronized, and a second set of opportunities for paging responses for a second set of UEs that is not time-synchronized. In some examples, the number of opportunities may include at least one of subcarrier regions, cyclic shifts, time slots, root sequences, or combinations thereof.

Paging response manager 935 may transmit, to the base station, the paging response to the received paging indication. The paging response may be transmitted on an uplink transmission resource, where the uplink transmission resource identifies an uplink transmission time, a subcarrier region, and/or a preamble. The paging response may be transmitted on at least one of the uplink transmission resources allocated for the paging response. In some cases, the paging response may include information for a base station beam (e.g., a beam for a receiving base station to use for paging information). The base station beam may be identified (e.g., by paging response manager 935) based on a link quality of a synchronization signal (e.g., based on a received signal receive power (RSRP), received signal strength indicator (RSSI), reference signal receive quality (RSRQ), signal-to-noise ratio (SNR), etc. associated with one or more received synchronization signals). In some cases, the one or more synchronization signals may include a primary synchronization signal (PSS), or a secondary synchronization signal (SSS), or a demodulation reference signal (DMRS) of a physical broadcast channel (PBCH), and/or a PBCH. In such cases, paging information manager 940 may receive paging information based at least in part on the beam information transmitted in the paging response (e.g., via paging response manager 935).

Paging information manager 940 may receive paging information on a beam based at least in part on the transmission of the paging response.

Figure 10:
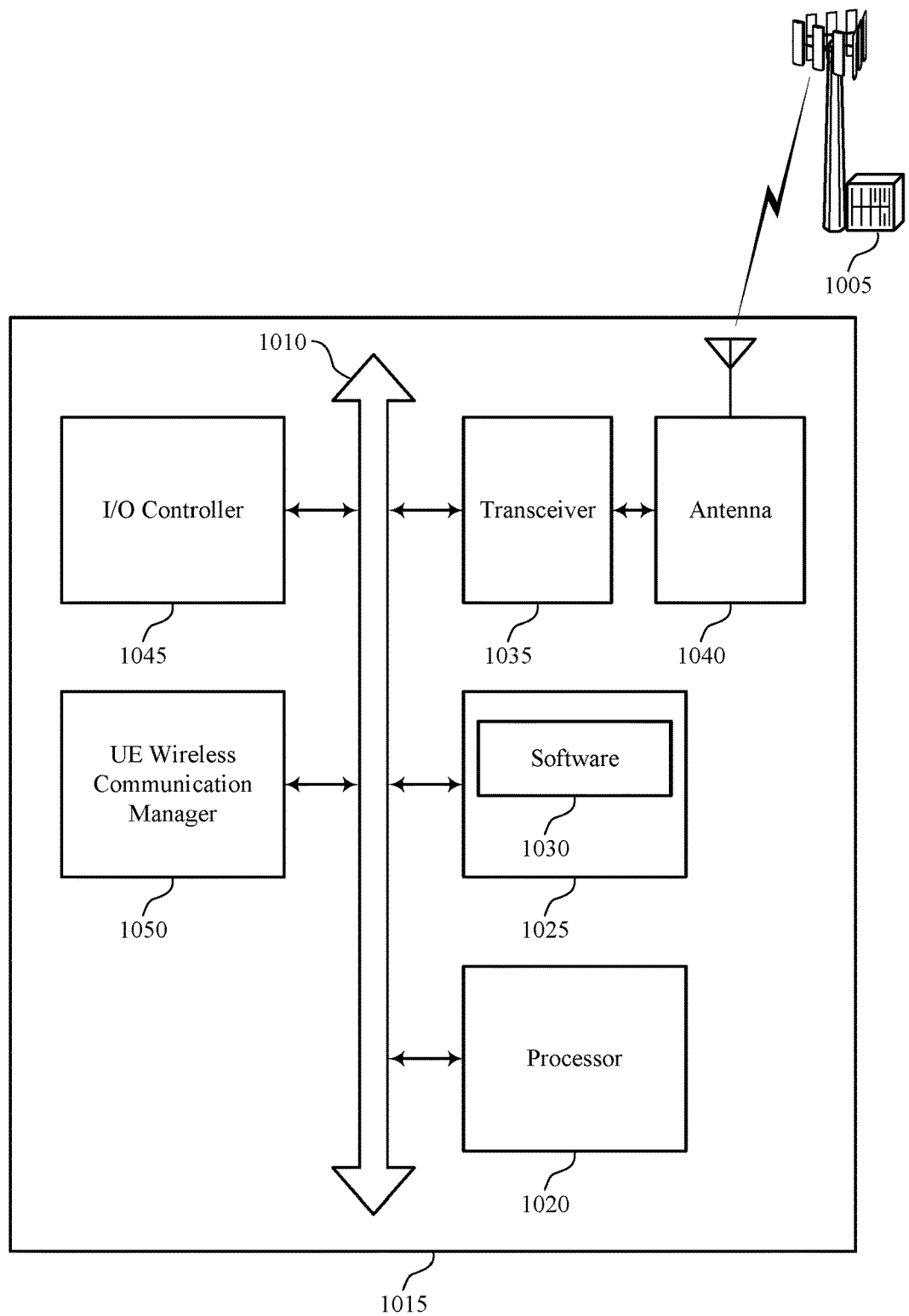
FIG. 10 illustrates a block diagram of a system including a UE that supports wireless communication in accordance with aspects of the present disclosure.

FIG. 10 shows a diagram of a system 1000 including a device 1015 that supports wireless communication in accordance with various aspects of the present disclosure. Device 1015 may be an example of or include the components of wireless device 705, wireless device 805, or a UE as described above, e.g., with reference to FIGS. 1, 2, 4, 6, 7, and 8. Device 1015 may include components for bi-directional voice and data communications including components for transmitting and receiving communications, including UE wireless communication manager 1050, processor 1020, memory 1025, software 1030, transceiver 1035, antenna 1040, and I/O controller 1045. These components may be in electronic communication via one or more busses (e.g., bus 1010). Device 1015 may communicate wirelessly with one or more base stations 1005.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting synchronization, paging, random access, etc.).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support synchronization, paging, random access, etc. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1015. I/O controller 1045 may also manage peripherals not integrated into device 1015. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1015 via I/O controller 1045 or via hardware components controlled by I/O controller 1045.

Figure 11:
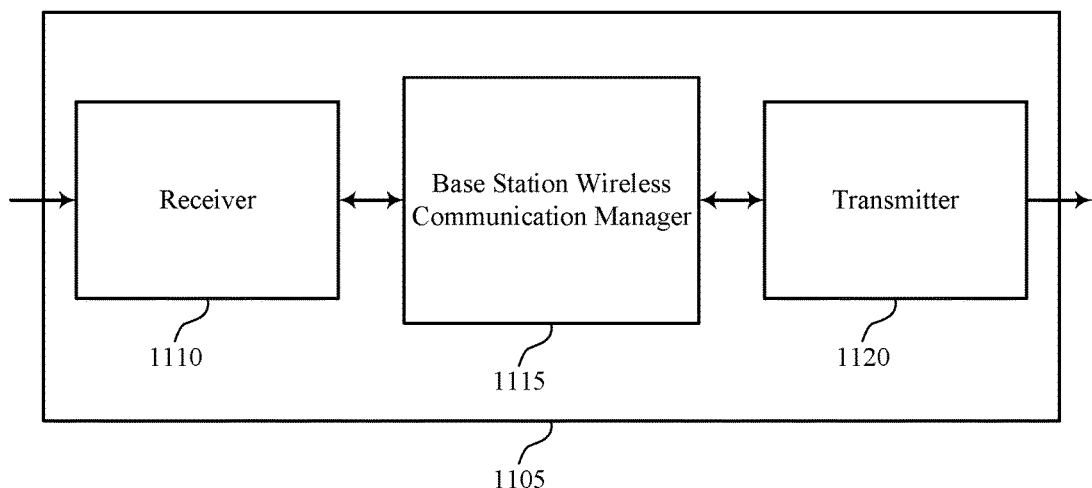
FIGS. 11 through 13 show block diagrams of a device that supports wireless communication in accordance with aspects of the present disclosure.

FIG. 11 shows a block diagram 1100 of a wireless device 1105 that supports wireless communication in accordance with various aspects of the present disclosure. Wireless device 1105 may be an example of aspects of a base station as described with reference to FIGS. 1, 2, 4, and 6. Wireless device 1105 may include receiver 1110, base station wireless communication manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to synchronization, paging, random access, etc.). Information may be passed on to other components of the device. The receiver 1110 may be an example of aspects of the transceiver 1435 described with reference to FIG. 14.

Base station wireless communication manager 1115 and/or at least some of its various sub-components may be implemented in hardware, software executed by a processor, firmware, or any combination thereof. If implemented in software executed by a processor, the functions of the base station wireless communication manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station wireless communication manager 1115 and/or at least some of its various sub-components may be physically located at various positions, including being distributed such that portions of functions are implemented at different physical locations by one or more physical devices. In some examples, base station wireless communication manager 1115 and/or at least some of its various sub-components may be a separate and distinct component in accordance with various aspects of the present disclosure. In other examples, base station wireless communication manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station wireless communication manager 1115 may be an example of aspects of the base station wireless communication manager 1460 described with reference to FIG. 14.

Base station wireless communication manager 1115 may identify uplink transmission resources for paging responses. Base station wireless communication manager 1115 may transmit a paging indication to at least one UE. Base station wireless communication manager 1115 may also receive a paging response from one or more UEs of the at least one UE using a receive beam sweep. The paging response may be received on an associated beam on at least one of the uplink transmission resources allocated for paging responses. In some examples, base station wireless communication manager 1115 may also transmit an indication of the uplink transmission resources allocated for paging responses. In some examples, base station wireless communication manager 1115 may transmit a paging indication to at least one UE, and receive a paging response from one or more UEs of the at least one UE using a receive beam sweep, the paging response received based on the transmitted paging indication. In some examples, the paging indication includes a search space to be monitored for a paging message transmitted to the one or more UEs. In some examples, the base station may also transmit a paging message to one or more UEs using resources indicated in the search space.

Transmitter 1120 may transmit signals generated by other components of the device. In some examples, the transmitter 1120 may be collocated with the receiver 1110 in a transceiver. For example, the transmitter 1120 may be an example of aspects of the transceiver 1435 described with reference to FIG. 14. The transmitter 1120 may include a single antenna, or it may include a set of antennas.

Figure 12:
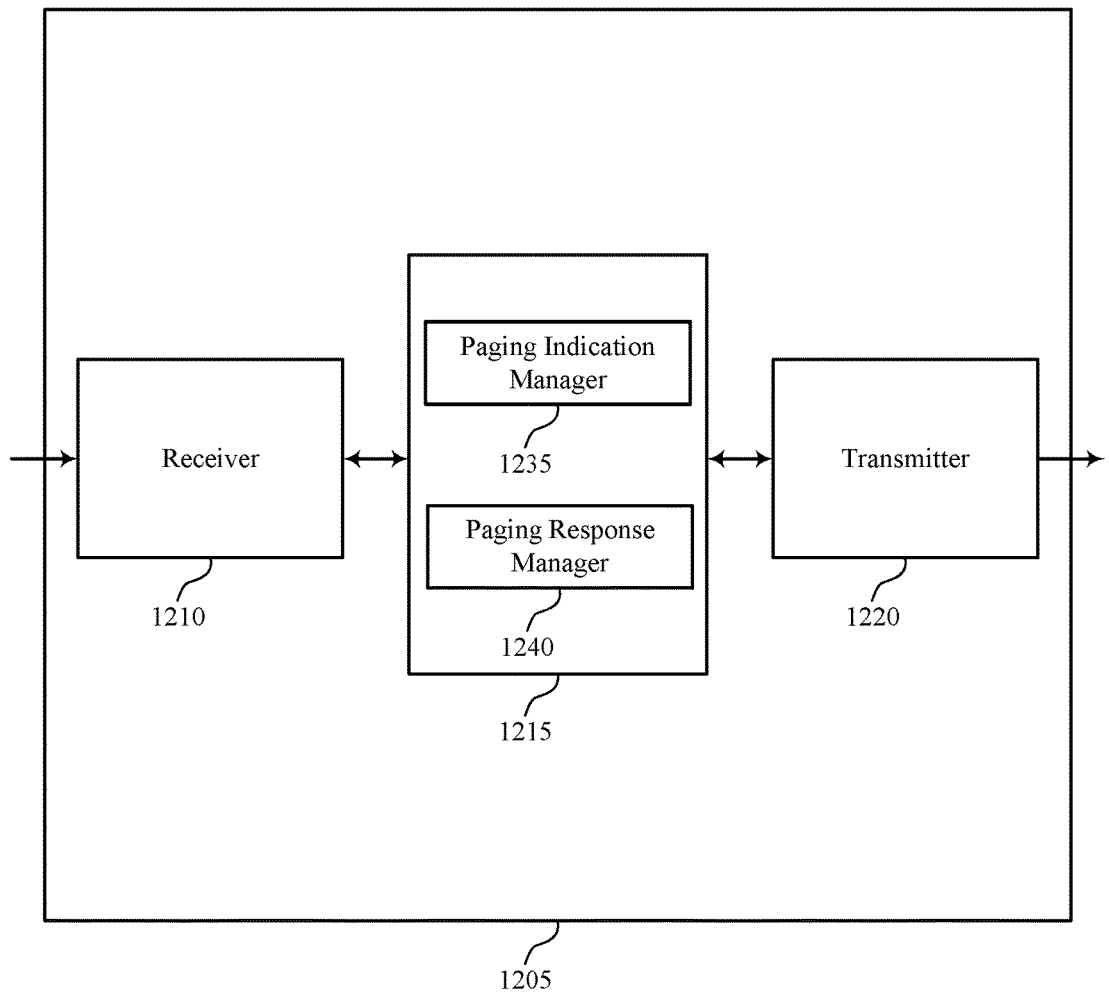

FIG. 12 shows a block diagram 1200 of a wireless device 1205 that supports wireless communication in accordance with various aspects of the present disclosure. Wireless device 1205 may be an example of aspects of a wireless device or a base station as described with reference to FIGS. 1, 2, 4, 6, and 11. Wireless device 1205 may include receiver 1210, base station wireless communication manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to synchronization, paging, random access, etc.). Information may be passed on to other components of the device. The receiver 1210 may be an example of aspects of the transceiver 1435 described with reference to FIG. 14.

Base station wireless communication manager 1215 may include paging indication manager 1235 and paging response manager 1240. Base station wireless communication manager 1215 may be an example of aspects of the base station wireless communication manager 1460 described with reference to FIG. 14.

Paging indication manager 1235 may transmit a paging indication to at least one UE. Paging response manager 1240 may receive a paging response from one or more UEs of the at least one UE using a receive beam sweep. The paging response may be received on an associated beam on at least one of the uplink transmission resources allocated for paging responses.

Transmitter 1220 may transmit signals generated by other components of the device. In some examples, the transmitter 1220 may be collocated with the receiver 1210 in a transceiver. For example, the transmitter 1220 may be an example of aspects of the transceiver 1435 described with reference to FIG. 14. The transmitter 1220 may include a single antenna, or it may include a set of antennas.

Figure 13:
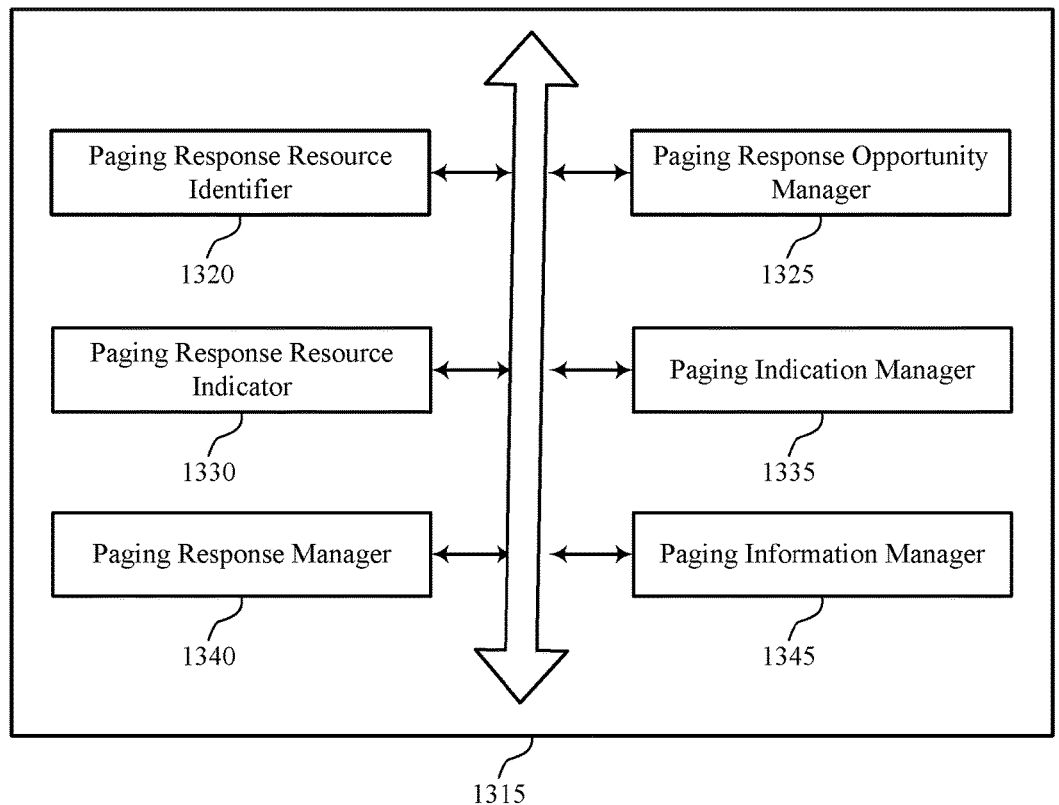

FIG. 13 shows a block diagram 1300 of a base station wireless communication manager 1315 in accordance with various aspects of the present disclosure. The base station wireless communication manager 1315 may be an example of aspects of a base station wireless communication manager described with reference to FIGS. 11, 12, and 14. The base station wireless communication manager 1315 may include paging response resource identifier 1320, paging response opportunity manager 1325, paging response resource indicator 1330, paging indication manager 1335, paging response manager 1340, and paging information manager 1345. Each of these modules may communicate, directly or indirectly, with one another (e.g., via one or more buses).

Paging response resource identifier 1320 may identify uplink transmission resources for paging responses. In some examples, the uplink transmission resources allocated for paging responses may include a set of one or more resources allocated for a group-based paging response. The group-based paging response may include paging responses from a group of UEs. In some examples, the one or more resources allocated for the group-based paging response may be allocated for a hash compression-based paging response. In some examples, the resources allocated for paging responses may include resources of a random access channel or a scheduling request channel.

Paging response opportunity manager 1325 may allocate a number of opportunities for paging responses within a time interval and frequency range of the uplink transmission resources allocated for paging responses. The number of opportunities may be allocated based at least in part on a presence or absence of time synchronization of UEs within a coverage area of the base station. In some examples, allocating the number of opportunities for paging responses based at least in part on the presence or absence of time synchronization of the UEs within the coverage area of the base station may include at least one of allocating relatively more opportunities for paging responses for a first set of UEs that is time-synchronized, allocating relatively fewer opportunities for paging responses for a second set of UEs that is not time-synchronized, or a combination thereof. In some examples, allocating the number of opportunities for paging responses based at least in part on the presence or absence of time synchronization of the UEs within the coverage area of the base station may include allocating a first set of opportunities for paging responses for a first set of UEs that is time-synchronized, and allocating a second set of opportunities for paging responses for a second set of UEs that is not time-synchronized. In some examples, the number of opportunities may include at least one of subcarrier regions, cyclic shifts, time slots, root sequences, or combinations thereof.

Paging response resource indicator 1330 may transmit an indication of the uplink transmission resources allocated for paging responses. In some examples, the indication of uplink transmission resources allocated for paging responses may be transmitted over at least one of a synchronization channel, a broadcast channel, a control channel, a RRC channel, or a combination thereof. In some examples, the indication of uplink transmission resources allocated for paging responses may be transmitted over a broadcast channel simultaneously with synchronization signals by sweeping through a set of beams. In some examples, the base station wireless communication manager 1315 may transmit synchronization signals by sweeping through a first set of beams, and transmitting the indication of uplink transmission resources allocated for paging responses over a broadcast channel by sweeping through a second set of beams.

Paging indication manager 1335 may transmit a paging indication to at least one UE. In some examples, the paging indication may be transmitted by sweeping through a set of beams. In some examples, the paging indication and the indication of uplink transmission resources allocated for paging responses may be transmitted on a same channel. In some examples, the paging indication includes a search space for a paging message to be transmitted in a subsequent shared channel transmission. The search space may include, in some examples, one or more slots or subframes to be monitored for the paging message. In some cases, the paging indication may be transmitted over a synchronization channel, a broadcast channel, a control channel and/or a RRC channel.

Paging response manager 1340 may receive a paging response from one or more UEs of the at least one UE using a receive beam sweep. The paging response may be received on an associated beam on at least one of the uplink transmission resources allocated for paging responses. In some cases, the paging response may include information relating to a base station beam. The base station may use such information for identifying a beam for transmission of paging information. In some cases the base station (e.g., paging response manager 1340) may receive the paging response form one or more UEs using a receive beam sweep.

Paging information manager 1345 may transmit paging information to the one or more UEs. The paging information for a UE may be transmitted to the UE on a beam on which a paging response is received from the UE (e.g., the paging information may be transmitted on a base station beam, where information relating to the base station beam is received in the paging response (e.g., received by paging response manager).

Figure 14:
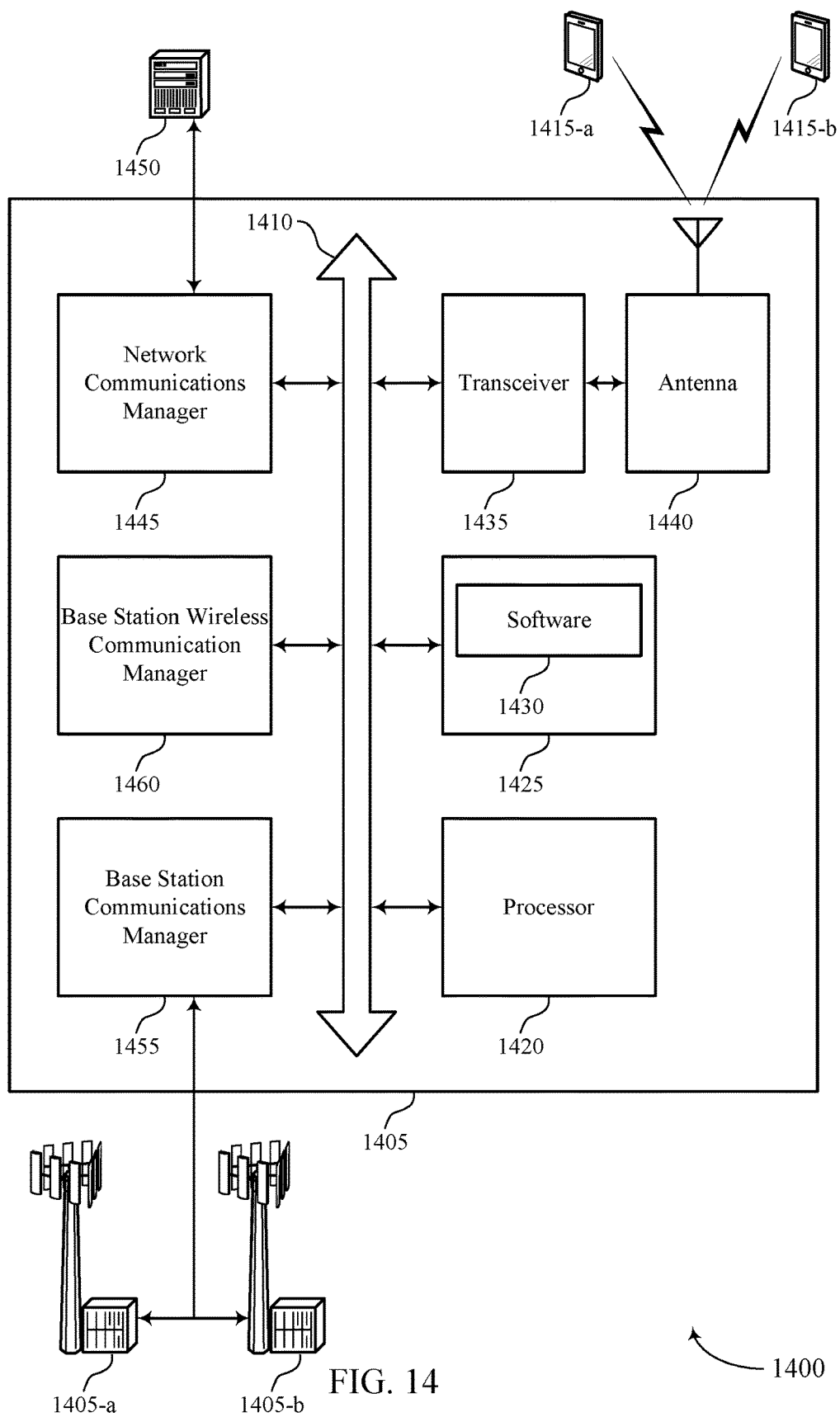
FIG. 14 illustrates a block diagram of a system including a base station that supports wireless communication in accordance with aspects of the present disclosure.

FIG. 14 shows a diagram of a system 1400 including a base station 1405 that supports wireless communication in accordance with various aspects of the present disclosure. Base station 1405 may be an example of or include the components of wireless device 1105, wireless device 1205, or a base station as described above, e.g., with reference to FIGS. 1, 2, 4, 6, 11, and 12. Base station 1405 may include components for bi-directional voice and data communications including components for transmitting and receiving communications, including base station wireless communication manager 1460, processor 1420, memory 1425, software 1430, transceiver 1435, antenna 1440, network communications manager 1445, and base station communications manager 1455. These components may be in electronic communication via one or more busses (e.g., bus 1410). Base station 1405 may communicate wirelessly with one or more UEs.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting synchronization, paging, random access, etc.).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support synchronization, paging, random access, etc. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs.

Base station communications manager 1455 may manage communications with other base station 1405-*a* and 1405-*b*, and may include a controller or scheduler for controlling communications with UEs 1415-*a* and 1415-*b* in cooperation with other base stations 1405-*a* and 1405-*b*. For example, the base station communications manager 1455 may coordinate scheduling for transmissions to UEs 1415-*a* and 1415-*b* for various interference mitigation techniques such as beamforming or joint transmission. In some examples, base station communications manager 1455 may provide an X2 interface within an Long Term Evolution (LTE)/LTE-A wireless communication network technology to provide communication between base stations 1405, 1405-*a* and 1405-*b*.

Figure 15:
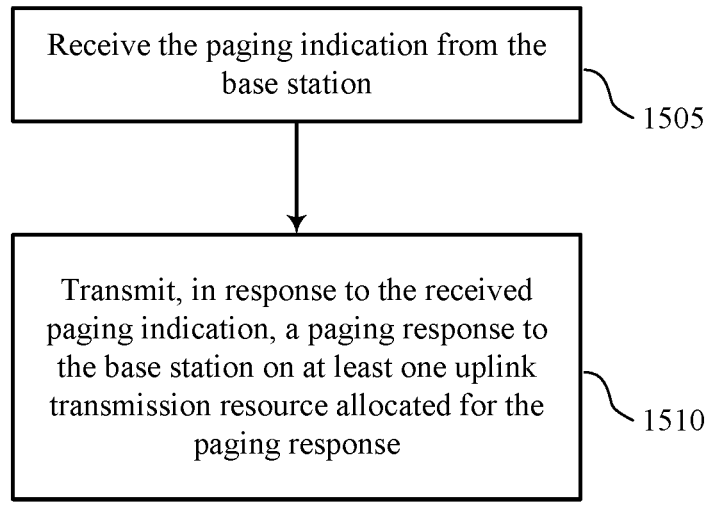
FIGS. 15 through 18 illustrate methods for wireless communication in accordance with aspects of the present disclosure.

FIG. 15 shows a flowchart illustrating a method 1500 for wireless communication in accordance with various aspects of the present disclosure. The operations of method 1500 may be implemented by a UE or its components as described herein. For example, the operations of method 1500 may be performed by a UE wireless communication manager as described with reference to FIGS. 7 through 10. In some examples, a UE may execute a set of codes to control the functional elements of the device to perform the functions described below. Additionally or alternatively, the UE may perform aspects of the functions described below using special-purpose hardware.

At block 1505 the UE may receive a paging indication from the base station. The operations of block 1505 may be performed according to the techniques described with reference to FIGS. 1 through 6. In certain examples, aspects of the operations of block 1505 may be performed by a paging indication manager as described with reference to FIGS. 7 and 8.

At block 1510 the UE may transmit, in response to the received paging indication, a paging response to the base station on at least one uplink transmission resource allocated for the paging response. In some cases, the paging response may be transmitted on at least one of the uplink transmission resources previously allocated for the paging response. The paging response may include information relating to a base station beam. In some cases, the UE may subsequently receive paging information from a base station, where the base station uses a beam associated with information the UE conveyed in the paging response. The operations of block 1510 may be performed according to the techniques described with reference to FIGS. 1 through 6. In certain examples, aspects of the operations of block 1510 may be performed by a paging response manager as described with reference to FIGS. 7 and 8.

Figure 16:
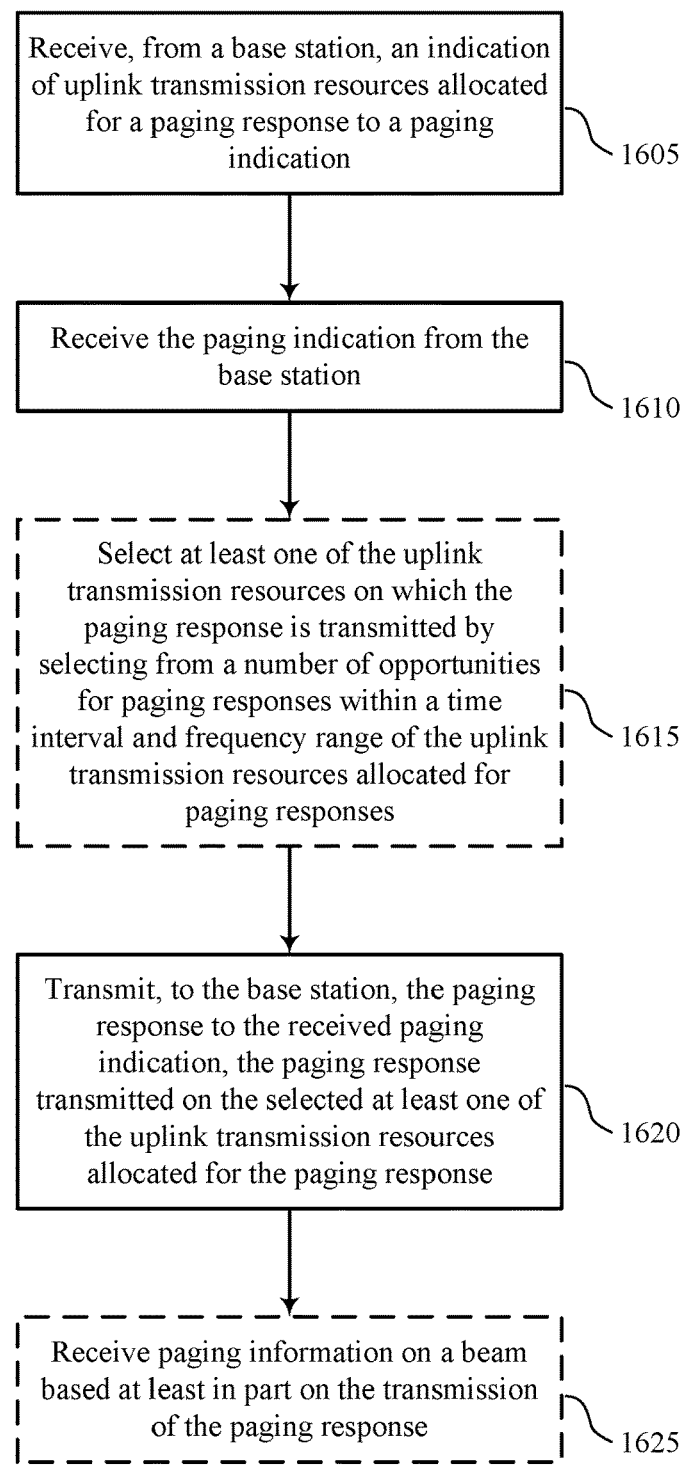

FIG. 16 shows a flowchart illustrating a method 1600 for wireless communication in accordance with various aspects of the present disclosure. The operations of method 1600 may be implemented by a UE or its components as described herein. For example, the operations of method 1600 may be performed by a UE wireless communication manager as described with reference to FIGS. 7 through 10. In some examples, a UE may execute a set of codes to control the functional elements of the device to perform the functions described below. Additionally or alternatively, the UE may perform aspects of the functions described below using special-purpose hardware.

At block 1605 a UE may receive, from a base station, an indication of uplink transmission resources allocated for a paging response to a paging indication. In some examples, receiving the indication of uplink transmission resources allocated for a paging response to a paging indication may include receiving the indication of uplink transmission resources allocated for the paging response over at least one of a synchronization channel, a broadcast channel, a control channel, a RRC channel, or a combination thereof. In some examples, the uplink transmission resources allocated for the paging response to the paging indication may include a set of one or more resources allocated for a group-based paging response. The group-based paging response may include paging responses from a group of UEs including the UE. In some examples, the one or more resources allocated for the group-based paging response may be allocated for a hash compression-based paging response. In some examples, the uplink transmission resources allocated for the paging response to the paging indication may include resources of a random access channel or a scheduling request channel. The operations of block 1605 may be performed according to the techniques described with reference to FIGS. 1 through 6. In certain examples, aspects of the operations of block 1605 may be performed by a paging response resource identifier as described with reference to FIGS. 7 and 8.

At block 1610 the UE may receive the paging indication from the base station. In some examples, the paging indication and the indication of uplink transmission resources allocated for the paging response may be received on a same channel. The operations of block 1610 may be performed according to the techniques described with reference to FIGS. 1 through 6. In certain examples, aspects of the operations of block 1610 may be performed by a paging indication manager as described with reference to FIGS. 7 and 8.

At block 1615 the UE may optionally select at least one of the uplink transmission resources on which to transmit the paging response by selecting from a number of opportunities for paging responses within a time interval and frequency range of the uplink transmission resources allocated for paging responses. The number of opportunities may be allocated (by a base station) based at least in part on a presence or absence of time synchronization of UEs within a coverage area of the base station. In some examples, the number of opportunities for paging responses may include relatively more opportunities for paging responses for a first set of UEs that is time-synchronized, relatively fewer opportunities for paging responses for a second set of UEs that is not time-synchronized, or a combination thereof. In some examples, the number of opportunities for paging responses may include a first set of opportunities for paging responses for a first set of UEs that is time-synchronized, and a second set of opportunities for paging responses for a second set of UEs that is not time-synchronized. In some examples, the number of opportunities may include at least one of subcarrier regions, cyclic shifts, time slots, root sequences, or combinations thereof. The operations of block 1615 may be performed according to the techniques described with reference to FIGS. 1 through 6. In certain examples, aspects of the operations of block 1615 may be performed by a paging resource opportunity selector as described with reference to FIGS. 7 and 8.

At block 1620 the UE may transmit, to the base station, the paging response to the received paging indication. The paging response may be transmitted on the selected at least one of the uplink transmission resources allocated for the paging response. The operations of block 1620 may be performed according to the techniques described with reference to FIGS. 1 through 6. In certain examples, aspects of the operations of block 1620 may be performed by a paging response manager as described with reference to FIG. 8.

At block 1625 the UE may optionally receive paging information on a beam based at least in part on the transmission of the paging response (e.g., based information relating to a base station beam that was included with the paging response). The operations of block 1625 may be performed according to the techniques described with reference to FIGS. 1 through 6. In certain examples, aspects of the operations of block 1625 may be performed by a paging information manager as described with reference to FIG. 8.

Figure 17:
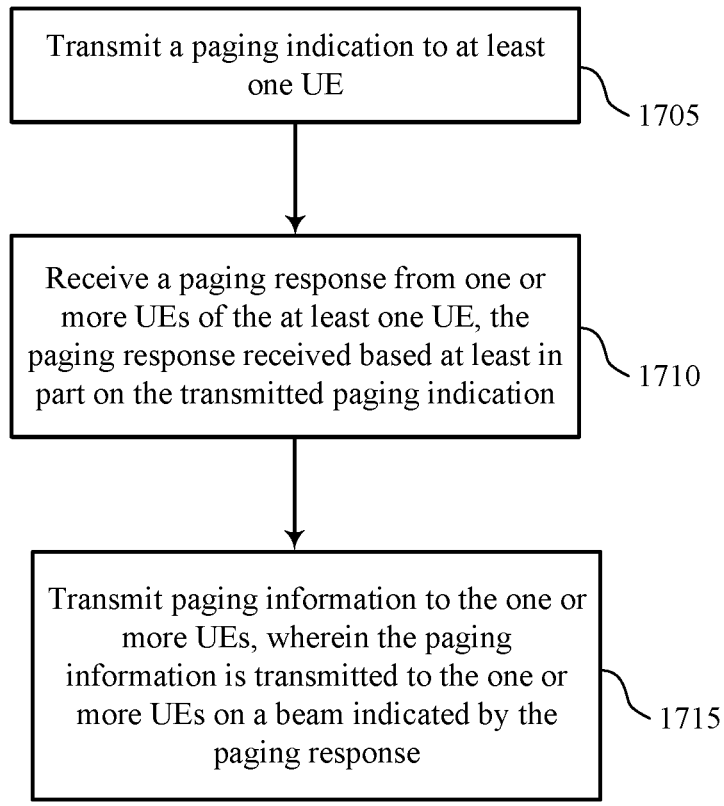

FIG. 17 shows a flowchart illustrating a method 1700 for wireless communication in accordance with various aspects of the present disclosure. The operations of method 1700 may be implemented by a base station or its components as described herein. For example, the operations of method 1700 may be performed by a base station wireless communication manager as described with reference to FIGS. 11 through 14. In some examples, a base station may execute a set of codes to control the functional elements of the device to perform the functions described below. Additionally or alternatively, the base station may perform aspects of the functions described below using special-purpose hardware.

At block 1705 the base station may transmit a paging indication to at least one UE. The operations of block 1705 may be performed according to the methods described with reference to FIGS. 1 through 6. In certain examples, aspects of the operations of block 1705 may be performed by a paging indication manager as described with reference to FIGS. 12 and 13.

At block 1710 the base station may receive a paging response from one or more UEs of the at least one UE (e.g., using a beam sweep). The paging response may be received based at least in part on the transmitted paging indication. The operations of block 1710 may be performed according to the methods described with reference to FIGS. 1 through 6. In certain examples, aspects of the operations of block 1710 may be performed by a paging response manager as described with reference to FIGS. 12 and 13.

At block 1715 the base station may transmit paging information to the one or more UEs. The paging information may be transmitted to the one or more UEs on a beam indicated by the paging response.

Figure 18:
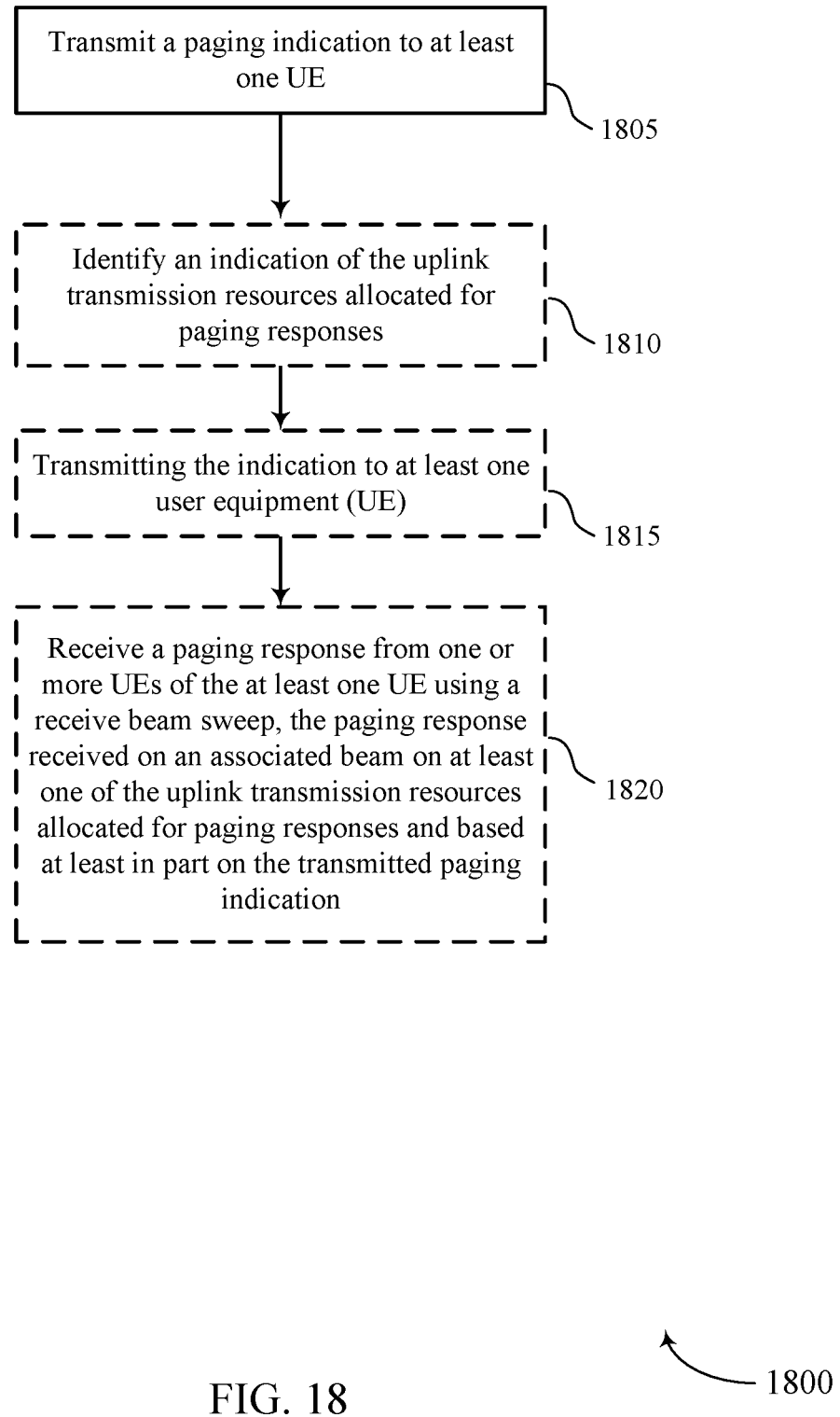

FIG. 18 shows a flowchart illustrating a method 1800 for wireless communication in accordance with various aspects of the present disclosure. The operations of method 1800 may be implemented by a base station or its components as described herein. For example, the operations of method 1800 may be performed by a base station wireless communication manager as described with reference to FIGS. 11 through 14. In some examples, a base station may execute a set of codes to control the functional elements of the device to perform the functions described below. Additionally or alternatively, the base station may perform aspects of the functions described below using special-purpose hardware.

At block 1805 the base station may transmit a paging indication to at least one UE. The operations of block 1805 may be performed according to the methods described with reference to FIGS. 1 through 6. In certain examples, aspects of the operations of block 1805 may be performed by a paging indication manager as described with reference to FIGS. 12 and 13.

At block 1810 the base station may identify an indication of the uplink transmission resources allocated for paging responses. The operations of block 1810 may be performed according to the methods described with reference to FIGS. 1 through 6. In certain examples, aspects of the operations of block 1810 may be performed by a paging response resource indicator as described with reference to FIGS. 12 and 13.

At block 1815 the base station may transmit the indication to at least one UE. The operations of block 1815 may be performed according to the methods described with reference to FIGS. 1 through 6. In certain examples, aspects of the operations of block 1815 may be performed by a paging response resource indicator as described with reference to FIGS. 12 and 13.

At block 1820 the base station may receive a paging response from one or more UEs of the at least one UE using a receive beam sweep. The paging response may be received from one or more UEs of the at least one UE using a receive beam sweep, the paging response received on an associated beam on at least one of the uplink transmission resources allocated for paging responses and based at least in part on the transmitted paging indication. The operations of block 1820 may be performed according to the methods described with reference to FIGS. 1 through 6. In certain examples, aspects of the operations of block 1820 may be performed by a paging response manager as described with reference to FIGS. 12 and 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a paging indication from a base station during a paging procedure, wherein the paging indication indicates at least one uplink transmission resource allocated for a paging response of the paging procedure;
    selecting the at least one uplink transmission resource by selecting from a number of opportunities for paging responses within a time interval and frequency range of uplink transmission resources allocated for paging responses, wherein the number of opportunities is allocated based at least in part on a presence or absence of time synchronization of UEs within a coverage area of the base station; and
    transmitting, in response to the received paging indication, the paging response to the base station on the selected at least one uplink transmission resource allocated for the paging response, the paging response indicating a base station beam to be used by the base station to transmit paging information of the paging procedure.

2. The method of claim 1, further comprising:
    receiving the paging information from the base station, the paging information transmitted by the base station based at least in part on the base station beam indicated by the paging response.

3. The method of claim 1, further comprising:
    identifying the base station beam based at least in part on a link quality of a synchronization signal.

4. The method of claim 3, wherein the synchronization signal comprises a primary synchronization signal (PSS), or a secondary synchronization signal (SSS), or a demodulation reference signal (DMRS) of a physical broadcast channel (PBCH), or a PBCH, or a combination thereof.

5. The method of claim 1, wherein the uplink transmission resource identifies an uplink transmission time, or a subcarrier region, or a preamble, or a combination thereof.

6. The method of claim 1, wherein the paging indication comprises a paging index associated with a group of mobile subscriber identities, and the paging response is transmitted on a paging index-specific uplink transmission resource.

7. The method of claim 6, wherein the paging indication comprises a paging index-specific preamble.

8. The method of claim 6, further comprising:
    receiving, in response to transmitting the paging response, at least one UE identifier associated with a page corresponding to the paging index.

9. The method of claim 6, further comprising:
    receiving with the paging index an indication of a type of mobile subscriber associated with the paging index.

10. The method of claim 1, wherein the paging indication includes a search space for a paging message, the search space comprises one or more slots or subframes for the paging message.

11. The method of claim 10, further comprising:
    monitoring resources indicated in the search space for the paging message.

12. A method for wireless communication at a base station, comprising:
    allocating a number of opportunities for paging responses within a time interval and frequency range of uplink transmission resources allocated for paging responses, wherein the number of opportunities is allocated based at least in part on a presence or absence of time synchronization of user equipment (UEs) within a coverage area of the base station;
    transmitting a paging indication to at least one UE during a paging procedure, wherein the paging indication indicates at least one uplink transmission resource allocated for a paging response of the paging procedure and a search space to be monitored for paging information;
    receiving the paging response from one or more UEs of the at least one UE, the paging response received based at least in part on the transmitted paging indication and the allocated number of opportunities;
    identifying a base station beam for the one or more UEs based at least in part on the received paging response; and
    transmitting, responsive to receiving the paging response from the one or more UEs, the paging information of the paging procedure to the one or more UEs on the identified base station beam using resources in the search space.

13. The method of claim 12, wherein information for the base station beam was received through the paging response.

14. The method of claim 12, wherein receiving the paging response from the one or more UEs comprises:

receiving the paging response from the one or more UEs using a receive beam sweep.

15. The method of claim 12, further comprising:
identifying uplink transmission resources for paging responses;
transmitting, using a transmit beam sweep, an indication of the uplink transmission resources allocated for a paging response; and
receiving the paging response from the one or more UEs based at least in part on the indicated uplink transmission resources.

16. The method of claim 12, wherein the paging indication comprises a paging index associated with a group of mobile subscriber identities, and the paging response is transmitted on a paging index-specific uplink transmission resource.

17. The method of claim 16, wherein:
the paging indication comprises a paging index-specific preamble.

18. The method of claim 16, wherein the uplink transmission resources allocated for paging responses comprise uplink transmission resources allocated to each of a plurality of paging indices representing groups of mobile subscriber identities, and the paging indication comprises a transmission on an uplink transmission resource allocated to the paging index.

19. The method of claim 16, further comprising:
transmitting with the paging index an indication of a type of mobile subscriber associated with the paging index; and
transmitting, in response to receiving the paging response, at least one UE identifier associated with a page corresponding to the paging index.

20. The method of claim 12, wherein the paging indication is transmitted by sweeping through a set of beams.

21. The method of claim 12, further comprising:
transmitting an indication of the uplink transmission resources allocated for paging responses over at least one of: a synchronization channel, a broadcast channel, a control channel, a radio resource control (RRC) channel, or a combination thereof.

22. The method of claim 12, further comprising:
transmitting the paging indication over at least one of: a synchronization channel, a broadcast channel, a control channel, a radio resource control (RRC) channel, or a combination thereof.

23. The method of claim 12, further comprising:
transmitting the paging indication over a broadcast channel simultaneously with synchronization signals by sweeping through a set of beams.

24. An apparatus for wireless communication, comprising:
a processor;
memory in electronic communication with the processor; and
instructions stored in the memory and operable, when executed by the processor, to cause the apparatus to:
receive a paging indication from a base station during a paging procedure, wherein the paging indication indicates at least one uplink transmission resource allocated for a paging response of the paging procedure;
select the at least one uplink transmission resource by selecting from a number of opportunities for paging responses within a time interval and frequency range of uplink transmission resources allocated for paging responses, wherein the number of opportunities is allocated based at least in part on a presence or absence of time synchronization of UEs within a coverage area of the base station; and
transmit, in response to the received paging indication, the paging response to the base station on the selected at least one uplink transmission resource allocated for the paging response, the paging response indicating a base station beam to be used by the base station to transmit paging information of the paging procedure.

25. An apparatus for wireless communication, comprising:
a processor;
memory in electronic communication with the processor; and
instructions stored in the memory and operable, when executed by the processor, to cause the apparatus to:
allocate a number of opportunities for paging responses within a time interval and frequency range of uplink transmission resources allocated for paging responses, wherein the number of opportunities is allocated based at least in part on a presence or absence of time synchronization of user equipment (UEs) within a coverage area of the base station;
transmit a paging indication to at least one UE during a paging procedure, wherein the paging indication indicates at least one uplink transmission resource allocated for a paging response of the paging procedure and a search space to be monitored for paging information;
receive the paging response from one or more UEs of the at least one UE using a receive beam sweep, the paging response received based at least in part on the transmitted paging indication and the allocated number of opportunities;
identify a transmission beam for the one or more UEs based at least in part on the received paging response; and
transmit, responsive to receiving the paging response from the one or more UEs, the paging information of the paging procedure to the one or more UEs on the identified base station beam using resources in the search space.

* * * * *